US010967307B1

(12) United States Patent
Stalnaker et al.

(10) Patent No.: US 10,967,307 B1
(45) Date of Patent: Apr. 6, 2021

(54) AUTOMATED, SELF-CLEANING FILTER

(71) Applicant: SW FILTER SOLUTIONS LLC, Lehigh Acres, FL (US)

(72) Inventors: Jeffrey Stalnaker, Lehigh Acres, FL (US); Roger Withrow, Estero, FL (US); Denver Kimberlin, Coweta, OK (US)

(73) Assignee: SW FILTER SOLUTIONS LLC, Lehigh Acres, FL (US)

( * ) Notice: Subject to any disclaimer, the term of this patent is extended or adjusted under 35 U.S.C. 154(b) by 0 days.

(21) Appl. No.: 16/921,356

(22) Filed: Jul. 6, 2020

(51) Int. Cl.
*B05B 1/14* (2006.01)
*B01D 29/60* (2006.01)
*C02F 1/00* (2006.01)
*G05B 19/042* (2006.01)
*B01D 29/64* (2006.01)

(52) U.S. Cl.
CPC .............. *B01D 29/603* (2013.01); *B05B 1/14* (2013.01); *C02F 1/004* (2013.01); *G05B 19/0423* (2013.01); *B01D 29/64* (2013.01); *B01D 2201/54* (2013.01); *C02F 2303/14* (2013.01); *C02F 2303/16* (2013.01)

(58) Field of Classification Search
CPC ................ B01D 23/24; B01D 2321/40; B01D 2321/02; B01D 29/64; B01D 29/6438; B01D 29/6446; B01D 41/04; B01D 65/02
See application file for complete search history.

(56) References Cited

U.S. PATENT DOCUMENTS

| 3,236,249 A | 2/1966 | Everroad |
| 3,297,163 A | 1/1967 | Landon |
| 3,363,771 A | 1/1968 | Walters |
| 4,790,942 A | 12/1988 | Shmidt et al. |
| 5,074,999 A | 12/1991 | Drori |
| 5,989,419 A | 11/1999 | Dudley et al. |
| 6,156,213 A | 12/2000 | Dudley et al. |
| 6,666,976 B2 | 12/2003 | Benenson, Jr. et al. |
| 6,874,641 B2 | 4/2005 | Clary |
| 7,794,591 B2 | 9/2010 | Nibler |
| 9,422,738 B2 | 8/2016 | Hegi |

(Continued)

FOREIGN PATENT DOCUMENTS

| DE | 3537138 A1 | 4/1987 |
| FR | 2913348 A1 | 9/2008 |
| FR | 2944454 A1 | 10/2010 |

OTHER PUBLICATIONS

Caleb Zinn et al. "How are water treatment technologies used in developing countries and which are the most effective? An implication to improve global health." Journal of Public Health and Emergency. 2018;2:25, 14 pages.

*Primary Examiner* — Mikhail Kornakov
*Assistant Examiner* — Natasha N Campbell
(74) *Attorney, Agent, or Firm* — Aslan Law, P.C.

(57) ABSTRACT

A self-cleaning, automated apparatus with a filter for fluids includes a nozzle unit assembly that has a first tube inside a second tube. Each of the tubes has a different pattern of one or more slots or holes. One tube rotates while the other is fixed, so that part of the pattern of one coincides with the other at times, resulting in a jet of cleaning fluid that removes debris from a filter. The filter is rotated so the jet can reach all parts to be cleaned. The pattern of the rotating tube may approximate a helix and the pattern of the fixed tube may approximate a line.

11 Claims, 18 Drawing Sheets

(56) References Cited

U.S. PATENT DOCUMENTS

| | | | |
|---|---|---|---|
| 9,675,910 B1* | 6/2017 | Wade | B05B 15/60 |
| 2002/0144952 A1* | 10/2002 | Saxton | B01D 35/16 |
| | | | 210/739 |
| 2004/0149318 A1 | 8/2004 | Su | |
| 2005/0145725 A1* | 7/2005 | Chan | B05B 1/18 |
| | | | 239/530 |
| 2006/0243309 A1 | 11/2006 | Prescott et al. | |
| 2016/0058264 A1* | 3/2016 | Thiyagarajan | A47L 15/4282 |
| | | | 134/172 |

* cited by examiner

AUTOMATED, SELF-CLEANING FILTER

FIELD

This discussion relates to the cleaning of filters that remove particles from fluids. Although this discussion teaches the principles of the invention using several examples from water systems, the same issues and solutions apply to systems that filter fluids other than water in residential, commercial, and industrial systems.

BACKGROUND

Two primary classes of water systems are aquatic water systems and filtered water systems.

People exercise, play, and relax in aquatic water systems such as pools, spas, and hot tubs. People and nature make the aquatic water in aquatic water systems dirty, necessitating cleaning. Modern aquatic water systems employ a pump that forces the aquatic water to move through pipes to a filter system to remove impurities. The filter system strains the aquatic water through a filter that traps contaminants such as particles and, in some cases, chemicals. The filtered water recirculates back to an aquatic water reservoir through pipes, in the example of a pool.

People depend on filtered water systems to make water clean enough for a particular purpose such as drinking, farming, raising livestock, or use in industry. A filtered water system takes in water from a source, filters the water through a filter system, and outputs filtered water. Whereas an aquatic water system recirculates the water in a loop, to and from a reservoir such as a pool, a filtered water system receives water from a source and outputs the filtered water to a destination that is not the source. A filtered water system may, for example, be installed in a dwelling to improve the quality or taste of the drinking water. In another example, a filtered water system may be provided in a remote area to give the nearby population access to clean water. In another example, a filtered water system may be transported to the site of a natural disaster to help victims, whose normal supply of clean water is interrupted, obtain drinkable water.

Aquatic water systems and filtered water systems both use filters to trap contaminants. The contaminants trapped in the filter, however, collect over time. As the trapped contaminant accumulate, they begin to fill the filter pores through which the water must pass. The thus-constricted filter pores cannot pass the same volume of water per unit of time, reducing the performance of the water system: less water passing through the filter system leads to fewer contaminants being removed from the water. In an extreme case, the accumulated contaminants restrict the flow of water so much that the pump cannot push water through the filter system, and thus no further contaminants can be removed. The pump and the water quality both suffer degradation or failure.

Conventional approaches teach periodic filter replacement or cleaning.

Filter replacement is expensive and inconvenient. The replaced filter, loaded with contaminants, must be accommodated in a landfill. Filter replacement also requires the attention of a caretaker who periodically checks the filter, exercises judgment as to the timing of replacement, and manually swaps the dirty filter for a new, clean one.

Periodic filter cleaning overcomes some of the disadvantages of filter replacement, but at a price. Filter cleaning, in water systems, takes place outside the filter system or with the filter in its normal place (in situ or inline filter cleaning).

Removing a filter for cleaning can be laborious. Larger water systems have large filter systems with large, heavy filters. Cleaning a filter manually requires significant space and additional equipment. The quality of the manual cleaning operation leaves much to be desired in many instances. Moreover, this process, like that of filter replacement, still requires a careful caretaker.

Inline filter cleaning, until this disclosure of the inventive concepts below, has involved backwashing, a process profusely wasteful of water resources and requiring substantial manual intervention. With conventional inline filter cleaning, the water circulates backwards through the filter system to loosen and flush away contaminants. This cleaning process cleans the filter, but the backwards-flowing water, heavily laden with contaminants, cannot be recirculated to the aquatic water reservoir; it must be shunted out of the system, perhaps into a nearby field, down the drain, into the sewage system, or elsewhere. The volume of water required for successful backwashing increases with the size and dirtiness of the filter.

Backwashing permits filter re-use, an advantage over filter replacement. Backwashing requires less labor than filter removal for cleaning. Nevertheless, the backwashing process requires the caretaker to perform several acts: the recirculating pump is deactivated; the flow of water from the aquatic water reservoir to the filter system is blocked; the water filter system inlet is connected to a hose or pipe that will direct the dirty, backward-flowing water toward its desired destination; the recirculating pump or another pump is activated to force the aquatic water to flow opposite its normal direction, toward the outlet of the filter system; a suitable volume of water is forced backwards through filter; aquatic water is added back to the aquatic water reservoir in the volume that was spent in the backwashing; and at last all of the foregoing steps are reversed to restore normal water flow.

Then, because a significant volume of new, untreated water has been added to the system, the aquatic water in the reservoir is tested and treated as required to achieve health and sanitary standards. The backwashing process is thus labor-intensive and wasteful and does not overcome the requirement for the caretaker perform periodic checks and to exercise judgment as to when the operation should be performed.

Various filter-cleaning technologies have been developed.

U.S. Pat. No. 3,236,249, issued Feb. 22, 1966 (D1, hereafter), teaches an air filter cleaner apparatus for the air filters used with heavy industrial engines. Air is a kind of fluid. These filters have accordion-pleated, folded paper that traps particles in air flowing to an engine. The cleaner apparatus is adapted to clean filters of various sizes and wall thicknesses without changing the cleaner. The filter cleaner design does "not require driving motors or other power devices" and "eliminates all hand labor." This design provides multiple, interior spray heads and multiple, exterior spray heads. The exterior spray heads force water only against the exterior pleats of the air filter, but are angled so that an air filter placed into the cleaner apparatus rotates on a freely-rotatable platform under the force of the water, allowing the entire surface of the air filter's interior to rotate in front of the interior spray heads. The exterior spray heads, however, due to their angle with the exterior of the air filter, spray water not directly into the pleats of the air filter but obliquely, resulting in less effective cleaning compared to a design where the cleaning fluid is sprayed directly into the pleats of the air filter. All of the spray heads, interior and exterior, spray at the same time. Operation of this cleaning system requires the filter be removed from its normal operating location to a separate filter cleaner device.

U.S. Pat. No. 3,297,163, issued Jan. 10, 1967 (D2, hereafter), teaches in FIG. 6 a swimming pool filter that may be cleaned by a stationary jet stream, without separating the filter from its housing. The swimming pool filter in this document is not accordion-pleated but, instead, a series of vertically stacked but spaced disks. Outside the filter is an elongate jet manifold that has multiple jet openings directed inwardly toward the center of the filter. Like the device in D1, the device in this document D2 does not use a driving motor or a power device. Instead, the device includes either a manually operated crank handle or an angled stream of water directed against an impeller that rotates the filter to bring each part of the filter in front of the openings of the stationary, elongate, jet manifold. The filter cleaning operation can be actuated by manually operating a control lever. Like the device in D1, all of the cleaning jet openings operate at the same time.

U.S. Pat. No. 3,363,771, issued Jan. 16, 1968 (D3, hereafter), teaches a filter for possible use in a swimming pool. The filter is not accordion-pleated, but a screen mounted on the outside of a support structure, made of rods, that defines a cylinder. A motor rotates the cylinder during normal operation. This document describes a "nozzle in the form of a slot." This slot is the inlet for the normally circulating water to enter the filter system. This inlet slot directs water to be filtered against the mesh of the screen, covering the rotating cylinder, at an angle in opposition to the direction of rotation of the cylinder. Multiple pipes feed the inlet slot so that the water entering the filter system has a uniform flow along the length of the cylinder. The document teaches that the positioning of the inlet slot, the positioning and use of a mesh, and the location of the rods inside the cylinder close to but not touching the mesh, combine to induce a continuous automatic backwashing operation. The filter in D3 may be suited to remove only large particles which, when jarred loose from the wire mesh, separate out due to gravity.

German patent publication DE3537138A1, published Oct. 18, 1985 (D4, hereafter), teaches a device for cleaning a filter bag used in the manufacture of wet glues. During manufacturing, material is undesirably caked on the outside of the filter bag. To remove the caked-on material, multiple water jets are used on the inside and outside of the filter, all simultaneously operating, to fragment the caked-on material for removal.

U.S. Pat. No. 4,790,942, issued Dec. 13, 1988 (D5, hereafter), teaches a filtration apparatus with a semi-permeable membrane for use in reverse osmosis, ultrafiltration, dialysis, electro-dialysis, water-spitting, pervaporation and microfiltration, where one or more substances are separated from each other. The semi-permeable membrane is made of filter media, which can become clogged by the accumulation of dissolved or suspended material. The cleaning method does not use any directed jets of fluid.

U.S. Pat. No. 5,074,999, issued Dec. 24, 1991 (D6, hereafter), teaches a backflushing assembly for a cylindrical stack of filter disks. The disks are cleaned by introducing a backflushing water supply that induces a fluid-driven rotation to the filter disk stack, and by raising and lowering a backflushing nozzle assembly along the length of the filter disk stack, from within the interior of the stack. The raising and lowering is performed by manually or by introducing pressurized fluid into a cylinder connected to the nozzle assembly.

U.S. Pat. No. 5,989,419, issued Nov. 23, 1999 (D7, hereafter), teaches ways to clean pleated filter cartridges used in swimming pools. The document teaches that the filter is removed from its operational location and rinsed with a garden hose, combing each longitudinal pleat fold with water. The filter is then soaked in a solution of muriatic acid and water to remove calcium or mineral buildup, and then rinsed, loading the cartridge on a spindle rod and then using a garden hose to spray the filter while inducing rotation with the water flow. The document also teaches an in-situ cleaning system that sprays water from either one of two alternative manifolds equipped with multiple nozzle jets. One set of nozzle jets, mounted on one of the two manifolds, is angled to induce a clockwise spin on the filter which is allowed to freely spin on an axle and bearings. Another set of nozzle jets, mounted on the other of the two manifolds, is angled to induce a counterclockwise spin. All of the nozzles of a given manifold operate at the same time.

U.S. Pat. No. 6,156,213, issued Dec. 5, 2000 (D8, hereafter), teaches a system similar to the in-situ cleaning system of D7 for cleaning pleated filter cartridges. This document teaches sets of manifolds either exterior to the filter cartridge or interior to the filter cartridge.

United States patent application publication 2004-0149318, published Aug. 5, 2004 (D9, hereafter), relates to cleaning pleated filter cartridges. This document teaches that such cartridges should be cleaned from the inside-out direction to avoid the further impression of small-sized debris particles into the pleats, which might occur when cleaning from outside-in. In this document, multiple, angled nozzles spray fluid within the cartridge and induce the cartridge to rotate around the spray nozzles. All of the nozzles operate contemporaneously.

U.S. Pat. No. 6,874,641, issued Apr. 5, 2005 (D10, hereafter), teaches a self-cleaning filter assembly for a pleated filter cartridge where the cartridge is mounted on a hydrodynamic bearing that uses a film of water as the load bearing component that enables rotation of the cartridge filter element. A longitudinal manifold sprays fluid from a set of inclined nozzles along the length of the exterior of the pleated filter cartridge to clean the cartridge and also induce the cartridge to rotate on the hydrodynamic bearing. All of the nozzles spray contemporaneously.

United States patent application publication 2006-0243309A1, published Nov. 2, 2006 (D11 hereafter), teaches a portable cleaning device for cleaning paint rollers or spa and pool filters. Cleaning the filter or roller requires removing it from its operational location and placing it in the portable cleaning device. The portable cleaning device connects to a fluid source such as a garden hose; a longitudinal pipe with nozzles sprays water on the filter or roller while a second longitudinal pipe sprays fluid from a single opening onto an impeller to rotate the item being cleaned. All of the nozzles operate at the same time.

France patent application publication FR2913348A1, published Sep. 12, 2008, in the French language (D12 hereafter), appears to show a cleaning device for a hollow, cylindrical element, where an internal, longitudinal manifold and an external, longitudinal manifold simultaneously spray fluid from multiple jets along the length of the element as a motorized gear rotates the element.

France patent application publication FR2944454A1, published Oct. 22, 2010, in the French language (D13 hereafter), appears to show a cleaning device for a cylindrical element, where an external, longitudinal manifold sprays fluid from multiple nozzles along the length of the element. The nozzles are inclined to induce the element to rotate. Some internal nozzles spray fluid over part of the interior of the element.

U.S. Pat. No. 9,422,738, issued Aug. 23, 2016 (D14 hereafter), teaches an elongate nozzle tube arranged outside a filter element made of pleated sheets. The nozzle tube has openings that direct water along the exterior of the filter element. The filter element is rotated. The housing that encloses the filter element and the nozzle tube also includes an ultrasonic transducer tube at one side of the filter to aid in loosening deposits from the filter element surface. In normal operation, the water inlet introduces water to be filtered in an area outside the filter element, and the water outlet removes filtered water from a position interior to the filter element. The top of the filter element is closed by a plug. In a cleaning operation, a drive motor drives the filter element and a pump forces water into the nozzle tube. The nozzle tube has multiple nozzles formed as slots. Water pumped into the nozzle tube by the pump exits all of the nozzles at the same time, all along the length of the nozzle tube.

The more nozzles in use at the same time, however, the lower the pressure of the fluid ejected at any given nozzle.

SUMMARY

Apparatuses and methods for cleaning a filter element are disclosed below.

In one example of an inventive apparatus, a housing encloses a filter to be cleaned, an inner nozzle tube that has a helical pattern of holes, and an outer tube that has a linear pattern of holes or slots. The holes or slots of the outer tube are directed straight toward the filter. A motor rotates both the nozzle tube and the filter, but the outer tube remains fixed. Fluid entering the rotating nozzle tube escapes only where holes in the helical pattern line up with the holes or slots of the outer tube. Because the pattern of holes in the nozzle tube is a helix, the fluid leaving the slots of the outer tube appears to traverse the filter from top to bottom, or vice-versa, in a jet that has higher pressure than would have been possible in the absence of the nozzle tube.

One apparatus that implements this principle includes a first structure having a first outer surface, a first inner surface, and a first wall between the first inner surface and the first outer surface. The first structure has a first inner space, defined by the first inner surface. The first inner space has a first cylindrical chamber. The first cylindrical chamber has a first longitudinal axis. The first structure has a first outer diameter extending from the first outer surface and across the first cylindrical chamber in a first direction normal to the first longitudinal axis. The first wall has a first part with one or more first openings communicating between the first outer surface and the first cylindrical chamber. The one or more first openings are arranged in a first pattern.

The apparatus also includes a second structure having a second outer surface, a second inner surface, and a second wall between the second inner surface and the second outer surface. The second structure has a second inner space, defined by the second inner surface. The second inner space has a second cylindrical chamber. The second cylindrical chamber has a second longitudinal axis. The second structure has a second inner diameter extending from the second inner surface and across the second cylindrical chamber in a second direction normal to the second longitudinal axis. The second wall has a second part with one or more second openings, communicating between the second outer surface and the second cylindrical chamber, arranged in a second pattern.

The second pattern is different from the first pattern. The second inner diameter accommodates the first outer diameter, and the first cylindrical chamber is disposed within the second cylindrical chamber.

Implementations may include one or more of the following features. The first part of the first structure may include polyoxymethylene. The first pattern may approximate a helix about the first longitudinal axis. The second pattern may approximate a line parallel to the second longitudinal axis.

The apparatus may include a third structure and a housing. The third structure has a third longitudinal axis parallel to the second longitudinal axis. The third structure includes a third part with third openings sized to filter particles from a fluid passing through the third openings. The housing encloses at least the first part of the first wall of the first structure, the second part of the second wall of the second structure; and the third part of the third structure.

The third part of the third structure may include an elongate sheet of material folded accordion-style and disposed around the third longitudinal axis.

The first structure may have a first drive attachment transferring a first rotational force to the first structure. The third structure may have a third drive attachment transferring a third rotational force to the third structure.

The apparatus may include a motive power source operable to apply the first rotational force and the third rotational force.

The motive power source can be just one, single motor. The motor may produce both the first rotational force and the third rotational force. The motor may apply just one of the first or third rotational forces directly to either the first or third drive attachment, and may apply the other rotational force indirectly, via a drive belt or a gear, to the other drive attachment. In one embodiment, the other rotational force may be applied to the other drive attachment through one or more cogs, in a clockwork fashion.

The first structure may be coupled to a first fluid port to receive fluid to perform a cleaning operation. The housing may be coupled to a second fluid port to admit fluid to be filtered into the housing in a normal operation. The third structure may be coupled to a third fluid port to allow filtered fluid to exit the housing in a normal operation. The housing may be coupled to a fourth fluid port to allow dirty fluid to exit the housing during a cleaning operation.

The apparatus may include valves such as a nozzle unit valve controlling a flow of the fluid through the first fluid port, a drain valve controlling the flow of the fluid through the fourth fluid port, and a filter vent valve adapted to permit matter to escape from inside the housing to outside.

The apparatus may include an inlet port pressure sensor sensing an inflow pressure of the fluid at the second fluid port and an outlet port pressure sensor sensing an outflow pressure of the fluid at the third fluid port.

The apparatus may include a pump operable to move the fluid along a first fluid path including the second fluid port, the third structure, and the third fluid port.

In the apparatus, the nozzle unit valve, the drain valve, the inlet port pressure sensor, the outlet port pressure sensor, the filter vent valve, and the pump may be considered a set of flow components. The apparatus may have a flow control system operable to communicate with the set of flow components.

The flow control system of the apparatus may include a processing system having a hardware processor operable to perform a predefined set of basic operations in response to receiving a corresponding basic instruction selected from a predefined native instruction set of codes. The hardware processor may be coupled with a memory accessible to the processing system. The flow control system may also have a user-interface controller, controlled by the processing system, and user-interface logic.

The flow control system may include first machine codes stored in the memory and selected from the predefined native instruction set of codes of the hardware processor, adapted to operate with the user-interface controller to implement a user interface on a flow control display. The flow control system may also have flow-control logic including second machine codes stored in the memory and selected from the predefined native instruction set of codes of the hardware processor, adapted to interact with the set of flow components and the motive power source.

The flow-control logic may have a first flow-control sublogic controlling the nozzle unit valve to close, the drain valve to close, the filter vent valve to close, the pump to propel the fluid, and the motive power source not to apply the first rotational force nor the third rotational force, during a normal operation.

The flow-control logic may have a second flow-control sublogic controlling the nozzle unit valve to open, the drain valve to open, the filter vent valve to open, and the motive power source to apply the first rotational force and the third rotational force, during a cleaning operation.

In one disclosed method, there is provided a first structure having a first cylindrical chamber and a first wall with one or more first openings, in a first part of the first wall, arranged in a first pattern and communicating from the first cylindrical chamber through the first wall. In this method there may also be included the providing of a second structure having a second cylindrical chamber and a second wall with one or more second openings, in a second part of the second wall, arranged in a second pattern and communicating from the second cylindrical chamber through the second wall, the first part of the first wall being within the second cylindrical chamber at the second part of the second wall.

The first structure may be provided with a first fluid port to admit fluid into the first cylindrical chamber. The first structure may be provided with a first drive attachment adapted to receive a first rotational force. The second structure may be secured to a housing that encloses at least the first part of the first wall of the first structure and the second part of the second wall of the second structure.

Implementations may include one or more of the following features. The method may include providing within the housing a third structure having a third part with third openings sized to filter particles from the fluid passing through the third openings and orienting the one or more second openings directly toward the third structure.

The method may also include admitting fluid through the first fluid port and applying the first rotational force to the first drive attachment to rotate the first part of the first structure within the second part of the second structure.

The method may include contemporaneously applying of the first rotational force to the first drive attachment while applying a third rotational force to the third structure.

DETAILED DESCRIPTION

This detailed description explains a concrete embodiment of the inventive concepts. The many details and specificities provided in the description below are provided to teach the broad principles of the inventive concept. The full breadth of the inventive concept, however, is not intended to be limited to the details below.

Figure 1:
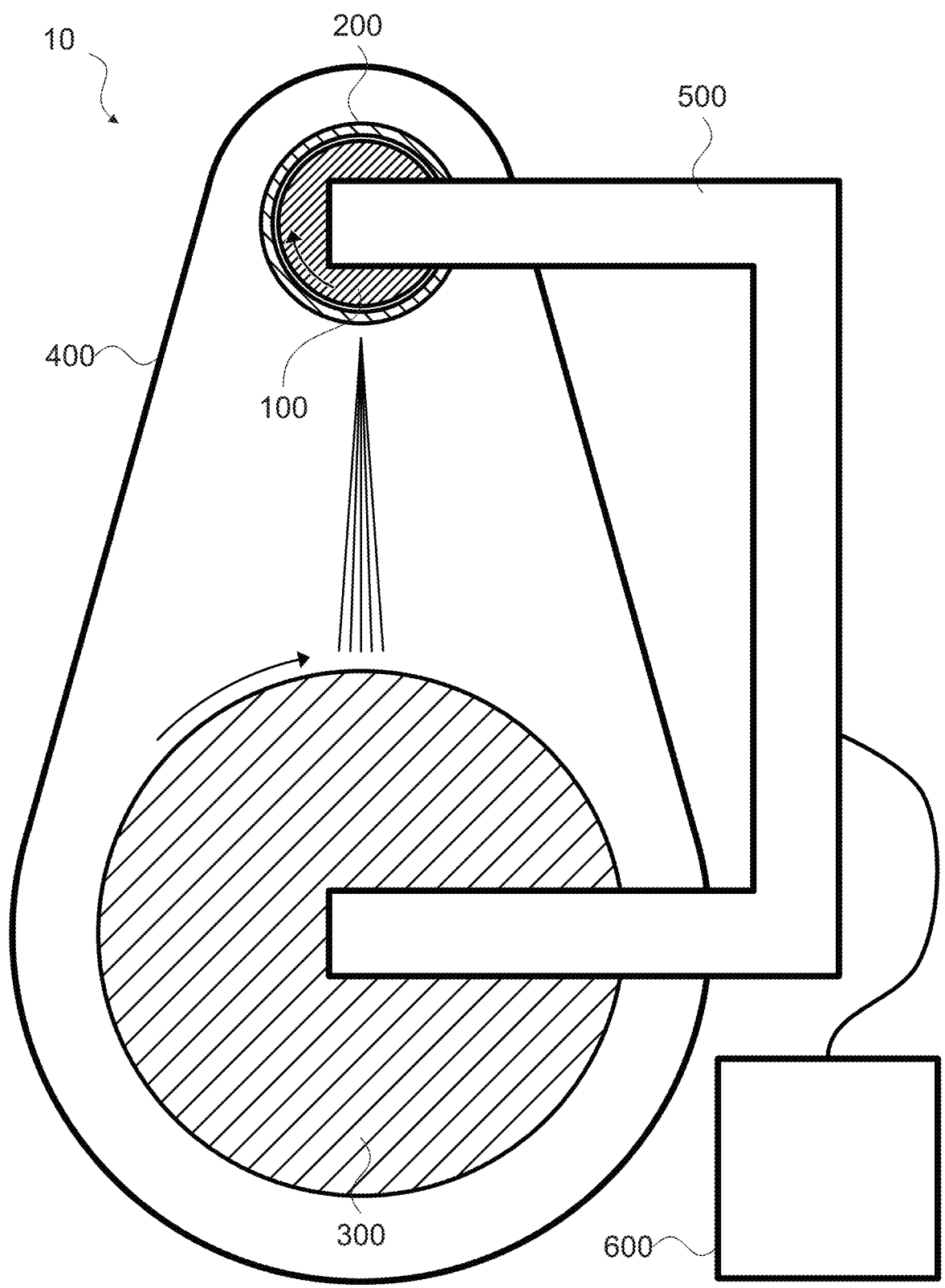
FIG. 1 shows a simplified view of an apparatus that represents an embodiment of a novel filter cleaning system.

FIG. 1 depicts, in a simplified, schematic form, the overall relationship between the major structures described below. In this figure, in an apparatus 10, a first structure 100 rotates within a second structure 200 to emit a powerful, traversing jet of fluid toward a rotating third structure 300. A housing 400 contains the fluid spray from escaping the apparatus. A motive power source 500 provides the rotational force that turns the first structure 100 and the third structure 300. A flow control system 600 may control these operations, and also open and close or start and stop various other flow components such as valves, pressure sensors, and pumps.

Figure 2:
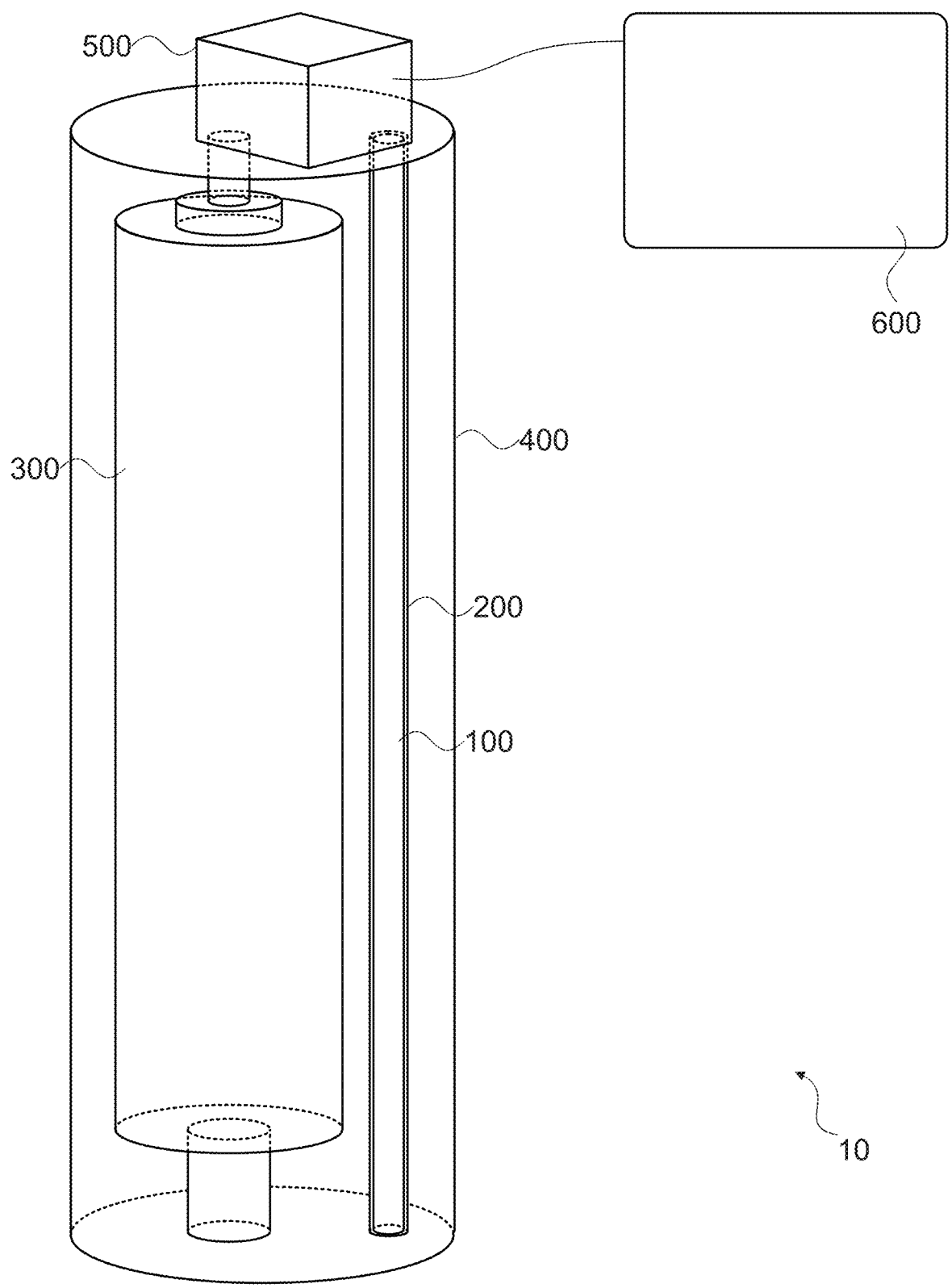
FIG. 2 shows a highly simplified, schematic view that explains a principle of a novel filter cleaning system.

FIG. 2 depicts another embodiment of the apparatus 10 shown in FIG. 1, viewed from above in a highly simplified, schematic form. The second structure 200 accommodates the first structure 100 within. The first structure 100 and the second structure 200 are accompanied within the housing 400 by a third structure 300 which is a filter. The second structure 200 is stationary. The first structure 100 rotates under a first rotational force imparted, under the control of the flow control system 600, by motive power source 500 as does the third structure 300.

The pattern of holes in the first structure 100, the first pattern, is different from the pattern of holes in the second structure 200, the second pattern. When the first structure 100 rotates within the second structure 200, the two patterns of holes align from time to time, allowing a jet of the fluid inside first structure 100 to escape through the holes in the first pattern that are aligned with holes in the second pattern.

Figure 3:
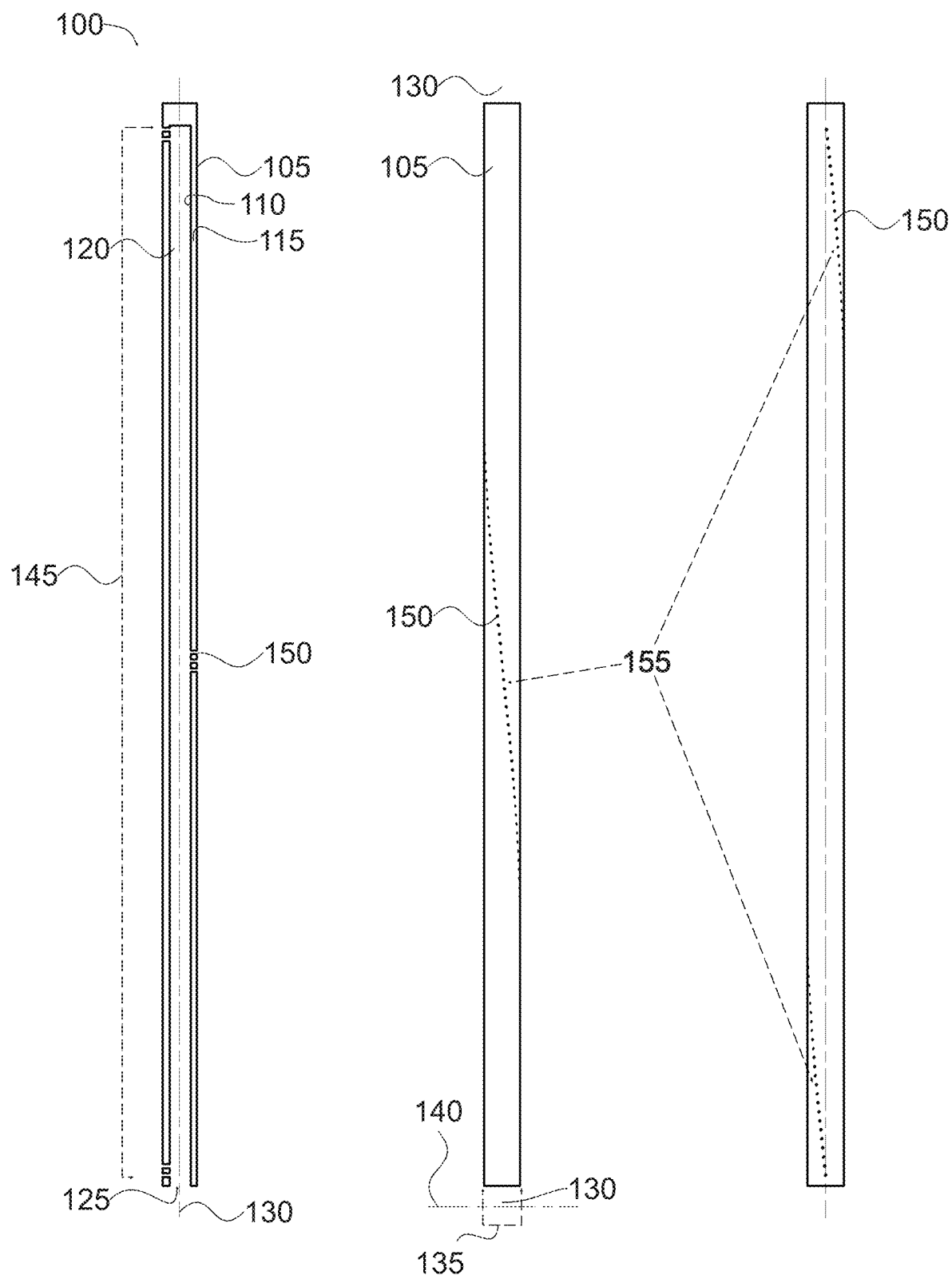
FIG. 3 shows various views of a suitable example of an inner nozzle tube with a helical pattern of holes, also referred to as a first structure.

Various views of the first structure 100 appear in FIG. 3. In the center view is a nozzle tube, also referred to as the first structure 100, viewed from the outside in a first orientation. To the right of the center view is a similar view of the first structure 100 after it is rotated half a turn. To the left of the center view is a cross-sectional view of the first structure 100, but as it would appear if the middle view were rotated a quarter turn toward the right.

The first structure 100 may, in many respects, be a hollow tube. The first structure 100 has an outer surface, referred to hereafter as the first outer surface 105. The first structure 100 has an inner surface, referred to hereafter as the first inner surface 110. A first wall 115 is between the first outer surface 105 and the first inner surface 110.

The first structure 100 has an interior, referred to hereafter as the first inner space 120. The first inner space 120 is defined by the first inner surface 110. Within the first inner space 120 is a first cylindrical chamber 125. The first inner space 120 need not be a cylindrical chamber along its entirety. Within the first inner space 120 a portion may optionally be non-cylindrical.

The first cylindrical chamber 125 has a first longitudinal axis 130 as seen in the center view of FIG. 3.

The first structure 100 has an outer diameter, referred to hereafter as the first outer diameter 135. The first outer diameter 135 may be thought of as extending from the first outer surface 105 and across the first cylindrical chamber 125 in a first direction 140 that is normal to the first longitudinal axis 130.

Part of the first wall 115 has openings. This part of the first wall 115 that has openings is referred to hereafter as a first part 145 of the first wall 115. The openings in the first wall 115, in this first part 145, are referred to hereafter as first openings 150. In other words, the first wall 115 has a first part 145 with one or more first openings 150. The first openings 150 communicate between the first outer surface 105 and the first cylindrical chamber 125.

The first openings 150 shown in FIG. 3 are a series of circular holes. The circular holes may, in an alternative embodiment, be replaced or replaced in part with a series of slots or a pattern of alternating circular holes and slots. In yet another alternative embodiment, the circular holes are replaced or replaced in part with elongate openings such as long slots.

The one or more first openings 150 are arranged in a pattern, referred to hereafter as a first pattern 155. In this example, the first pattern 155 approximates a helix about the first longitudinal axis 130. Other patterns may be used. In an alternative embodiment, the helix makes more than one complete revolution around the first longitudinal axis 130. In an alternative embodiment, the first pattern 155 approximates a double helix.

In one embodiment, the first part 145 of the first structure 100 comprises polyoxymethylene, which provides for a snug but slidable engagement between the first structure 100 and the second structure 200 and accommodates a very thin film of fluid therebetween which acts as a lubricant between the two structures. In alternative embodiments, the first structure 100 comprises materials other than polyoxymethylene.

Figure 4:
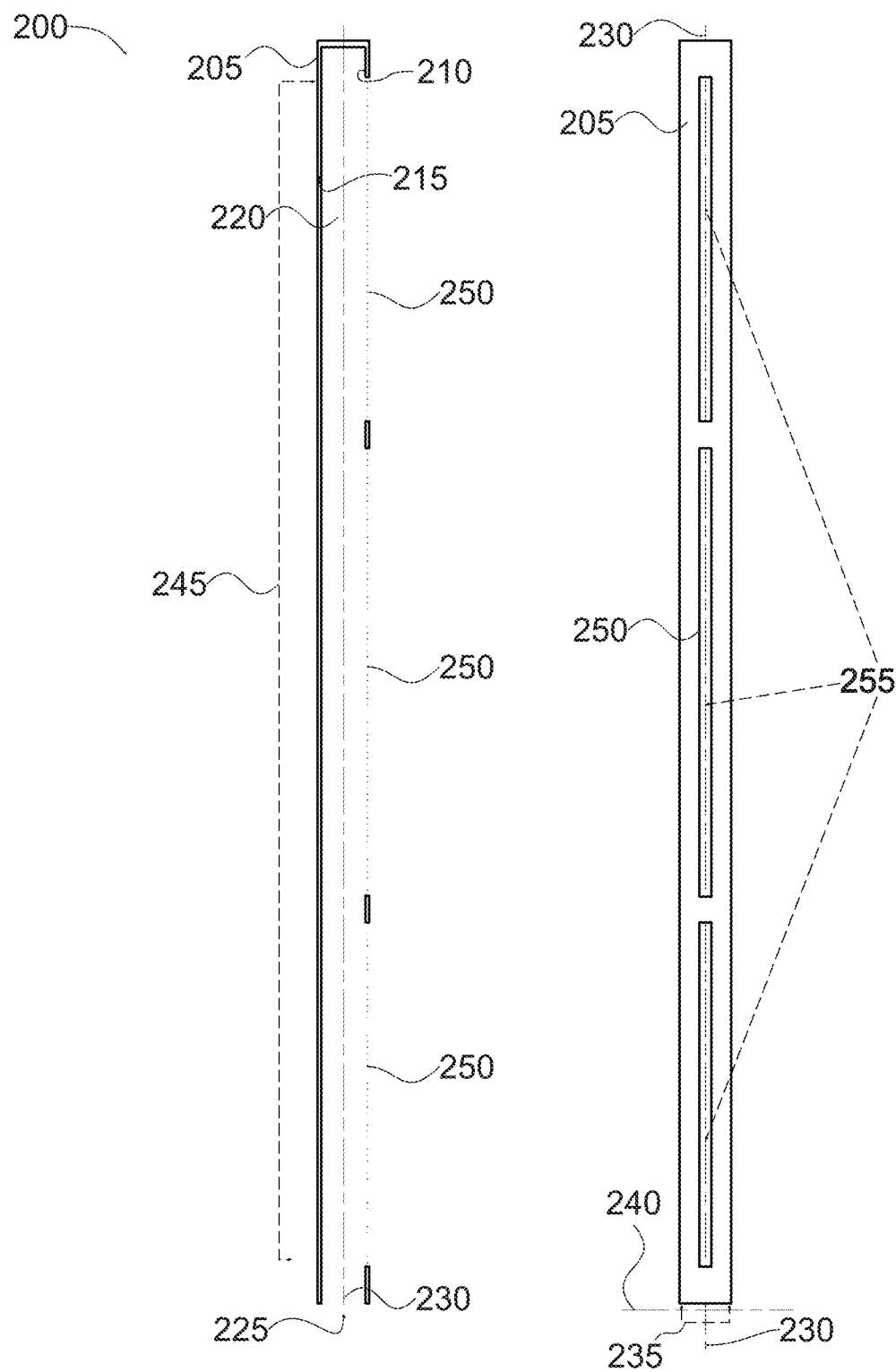
FIG. 4 shows various views of a suitable example of an outer tube with a liner pattern of slots, also referred to as a second structure.

Two views of an embodiment of the second structure 200, also referred to as an outer tube, are depicted in FIG. 4. The view on the left is from the side. The view on the right is a cross-section of the second structure 200 as if the view on the left were turned one-quarter of a turn to the right.

The second structure 200 has an outer surface, hereafter referred to as a second outer surface 205. The second structure 200 is generally hollow inside, and has an inner surface referred to, hereafter, as a second inner surface 210. The material between the second inner surface 210 and the second outer surface 205 forms a wall, referred to hereafter as the second wall 215.

The hollow, inside part of the second inner surface 210 is referred to, hereafter, as a second inner space 220. The second inner space 220 is defined by the second inner surface 210.

At least part of the second inner space 220 is a cylindrical chamber that accommodates the first structure 100. The cylindrical chamber in the second inner space 220 is referred to, hereafter, as the second cylindrical chamber 225. This second cylindrical chamber 225 has a longitudinal axis, about which the second cylindrical chamber 225 is disposed, referred to hereafter as a second longitudinal axis 230.

The second structure 200 has an inner diameter, referred to hereafter as a second inner diameter 235. The second inner diameter 235 extends from the second inner surface 210 and across the second cylindrical chamber 225 in a direction, hereafter referred to as a second direction 240, that is normal to the second longitudinal axis 230.

At least part of the second wall 215, hereafter referred to as a second part 245 of the second wall 215, has one or more openings. These openings in the second wall 215 are referred to hereafter as one or more second openings 250. The second openings 250 communicate between the second outer surface 205 and the second cylindrical chamber 225.

The second openings 250 are arranged in a pattern, hereafter referred to as a second pattern 255. The second pattern 255 shown in FIG. 4 approximates a line parallel to the second longitudinal axis 230. Other patterns may be used.

The one or more second openings 250 shown in FIG. 4 are three elongate slots. In an alternative embodiment, the one or more second openings 250 comprise only one elongate slot that replaces the three elongate slots shown in FIG. 4. In another alternative embodiment, the second openings 250 comprise a series of circular holes arranged along the same line. In yet another alternative embodiment, the second openings 250 comprise a combination of slots and circular holes.

The second pattern 255 is different from the first pattern 155. In other words, both patterns are not identical. In one embodiment, the first pattern 155 approximates a helix about the first longitudinal axis 130 and the second pattern 255 approximates a line parallel to the second longitudinal axis 230.

The second inner diameter 235 accommodates the first outer diameter 135 so that the first structure 100 can fit within the second structure 200 and so that the two structures can be moved rotationally, with respect to one another. When the first structure 100 is inside the second structure 200, the first cylindrical chamber 125 is disposed within the second cylindrical chamber 225.

Figure 5:
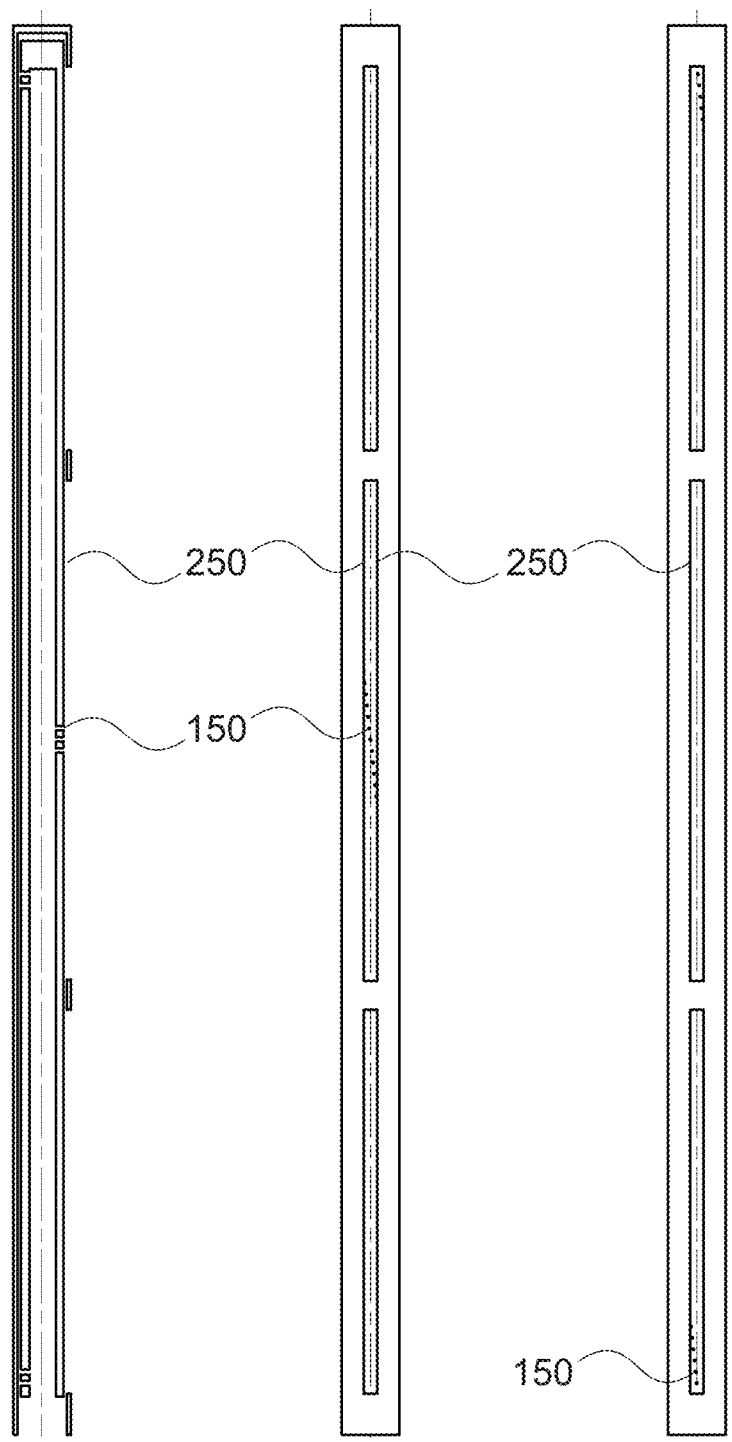
FIG. 5 shows how the first structure depicted in the example of FIG. 3 is accommodated within the second structure depicted in the example of FIG. 4.

The arrangement described in the preceding paragraph is illustrated in various views in FIG. 5. The center view of FIG. 5 shows the first structure 100 as depicted in the central view from FIG. 3 inside the second structure 200 as depicted in the right view from FIG. 4. The right view of FIG. 5 shows the first structure 100 as depicted in the right view from FIG. 3 inside the second structure 200 as depicted in the right view from FIG. 4. The left view of FIG. 5 shows the cross-section of the first structure 100 as depicted in the left view from FIG. 3 inside a cross-section of the second structure 200 as depicted in the left view from FIG. 4.

In FIG. 5, in the central view and the left view, the first openings 150 align with the second openings 250 in the middle of the two structures. In the right view, the first openings 150 align with the second openings 250 at the top and at the bottom of the structures.

The embodiment shown in FIG. 5 depicts the one or more second openings 250 being wider than the one or more first openings 150. In another embodiment, the second openings 250 are not so wide, and permit the concurrent alignment of only one or two of the first openings 150 with the second openings 250.

As shown in FIG. 5, rotating the first structure 100 with respect to the second structure 200 results in different ones of the one or more first openings 150 to align with the one or more second openings 250. When fluid under pressure is introduced within first structure 100, a jet of the fluid can escape through both the first structure 100 and second structure 200 only where the first openings 150 align with the second openings 250. Because most of the first openings 150 are occluded by the second wall 215 of the second structure 200, most of the first openings 150 are blocked form emitting fluid.

Thus, in the center view of FIG. 5, a jet of fluid would emerge from only the middle area where the first openings 150 and the second openings 250 align. As the first structure 100 continues to rotate, the jet emerges from a point that traverses vertically along the first longitudinal axis 130. Assuming, for the moment, that the first structure 100 rotates in a clockwise direction when viewed from the top, the jet of fluid traverses from the top of first structure 100 to the bottom. The right-side view of FIG. 5 shows the orientation of the first structure 100 and the second structure 200 at the instant the jet has reached the bottom and is just starting to start again at the top.

In an embodiment in which only one jet is emitted at a time, the force of the jet is stronger than if two or more jets are emitted. The force is much stronger than previously employed technology, in which every nozzle jet emits fluid at the same time. The result is that typical water pressure from an average home supplies enough of a jet to clean debris from a filter, avoiding the need to use a strong pump.

Figure 6:
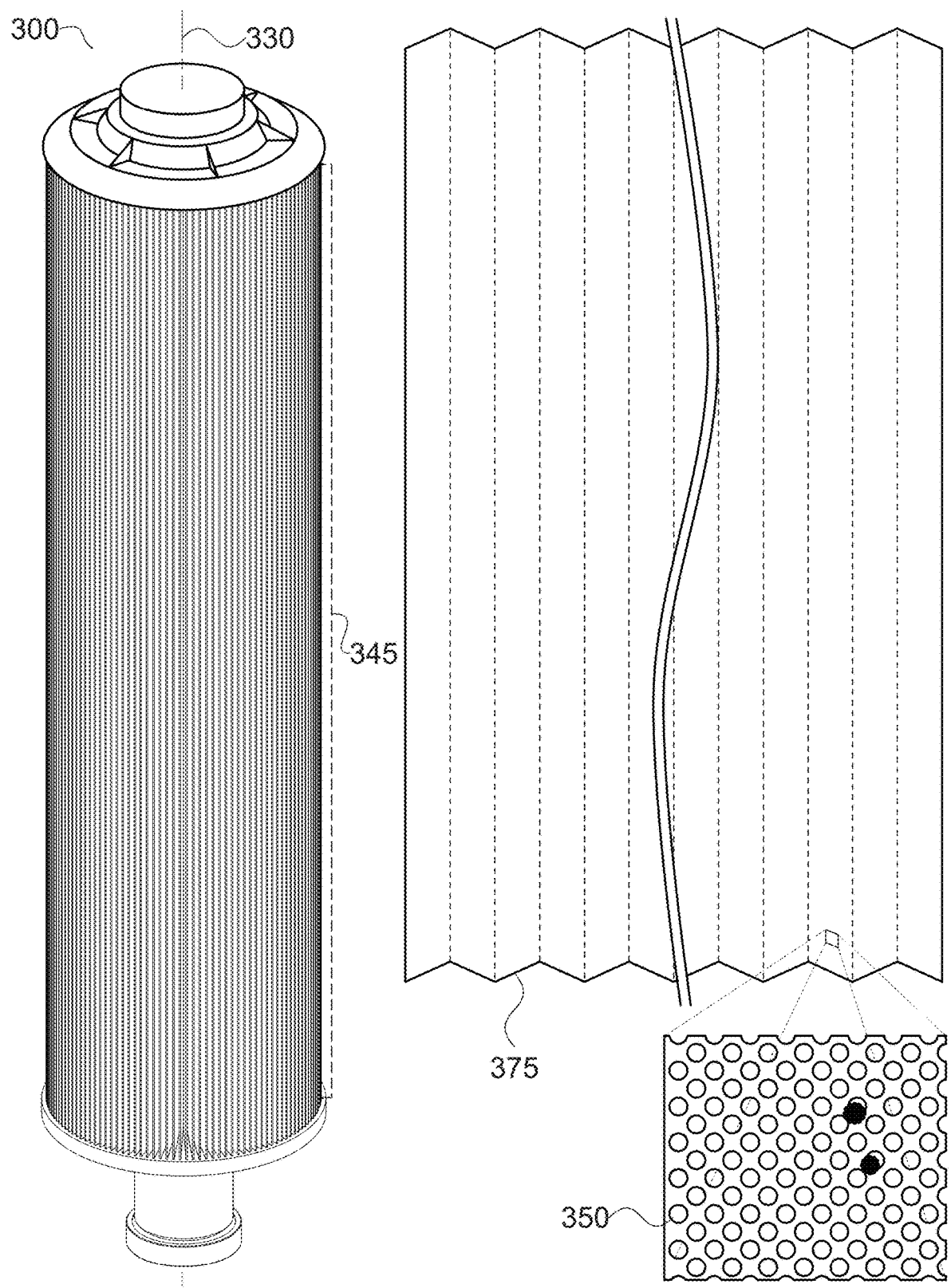
FIG. 6 shows various views of a filter, also referred to as a third structure.

A filter unit is depicted in FIG. 6. The filter unit is referred to hereafter as a third structure 300. The third structure 300 is rotatable about a longitudinal axis, referred to hereafter as a third longitudinal axis 330. Returning briefly to FIG. 1, it can be seen that the third longitudinal axis 330 is parallel to the second longitudinal axis 230.

At least part of the third structure 300, referred to hereafter as a third part 345 of the third structure 300, has openings sized to filter particles from a fluid passing therethrough. These filter openings are referred to, hereafter, as third openings 350.

In one embodiment, the third part 345 comprises an elongate sheet 375 of material folded accordion-style into pleats. The elongate sheet 375 is manufactured with the third openings 350 being sized to a predetermined diameter. It may be provided in micron mesh configurations and materials. The third openings 350 illustrated in FIG. 6 trap particles larger in size than the diameter of the third openings 350. It is these particles that accumulate and must be cleaned from time to time.

Returning to FIG. 1, a housing 400 encloses some or all of the first structure 100, the second structure 200, and the third structure 300. In an embodiment, some of the first structure 100, the second structure 200, or the third structure 300 extends outside of the housing for the sake of attachment or the like. In either situation, the housing 400 encloses at least the first part 145 of the first wall 115 of the first structure 100, at least the second part 245 of the second wall 215 of the second structure 200, and at least the third part 345 of the third structure 300.

As explained previously, during a cleaning operation the first structure 100 is rotated so that a traversing jet of fluid is emitted through the second openings 250 of the second structure 200, which are in an embodiment positioned to direct the traversing jet directly at the center of the third structure 300. The third structure 300 is also rotated so that various faces of the third part 345 may be brought opposite the traversing jet of fluid.

Figure 7:
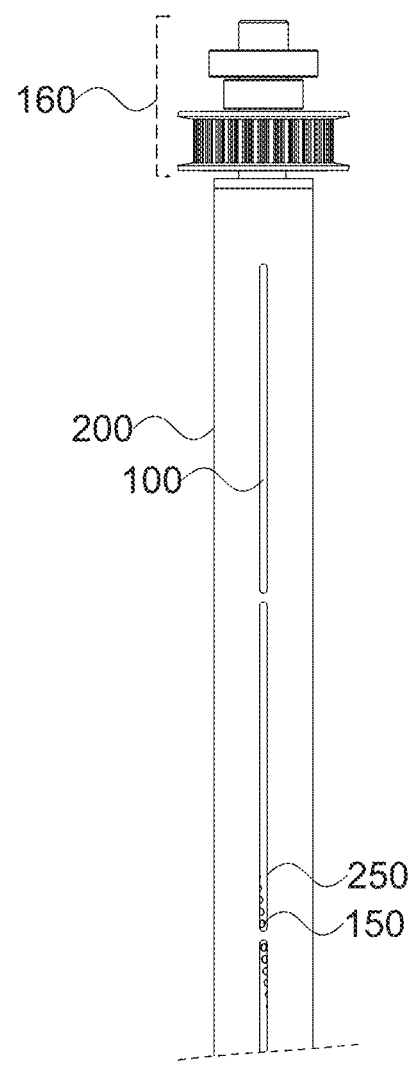
FIG. 7 shows a drive attachment added to part of the combined structure shown in FIG. 5, also referred to as a first drive attachment.

In an embodiment, the first structure 100 includes a first drive attachment 160 such as that shown in FIG. 7. The first drive attachment 160 is adapted to receive a rotational force, hereafter referred to as a first rotational force 165, and to transfer it to the first structure 100. Likewise, the third structure 300 may include a third drive attachment 360 such as that shown in FIG. 8. The third drive attachment 360 is adapted to receive a respective rotational force, hereafter referred to as a third rotational force 365, and to transfer it to the third structure 300.

Figure 8:
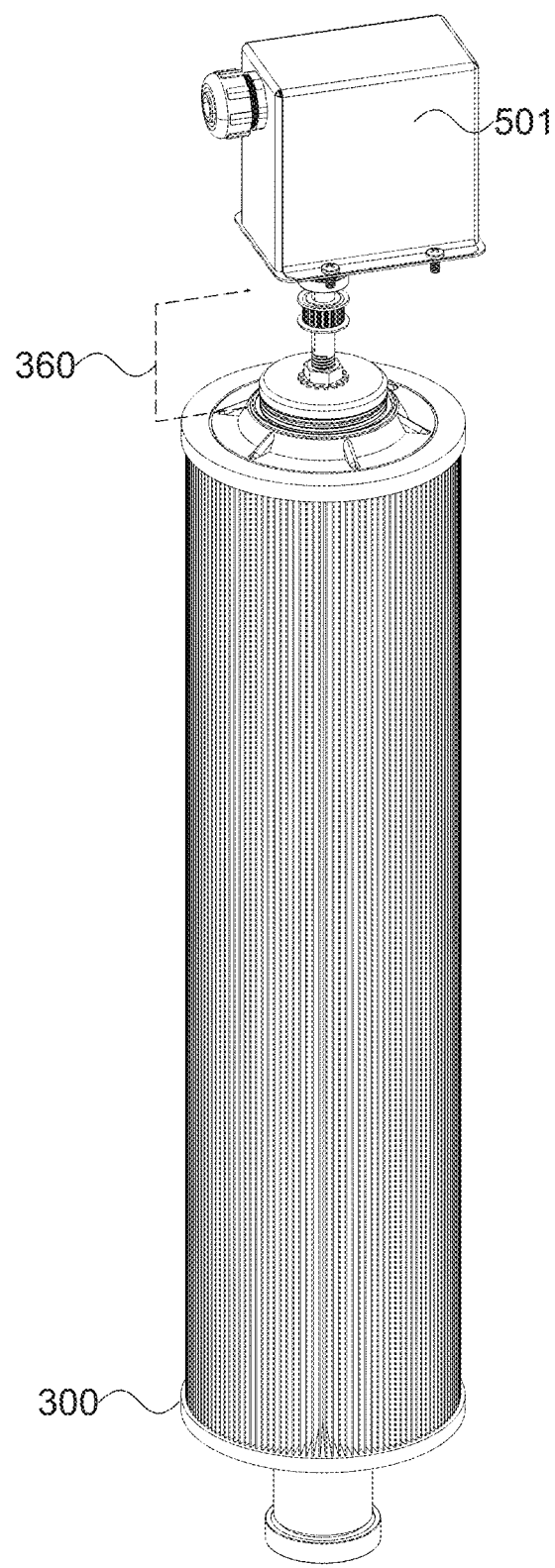
FIG. 8 shows a drive attachment added to the filter depicted in FIG. 6, also referred to as a third drive attachment.
Figure 9:
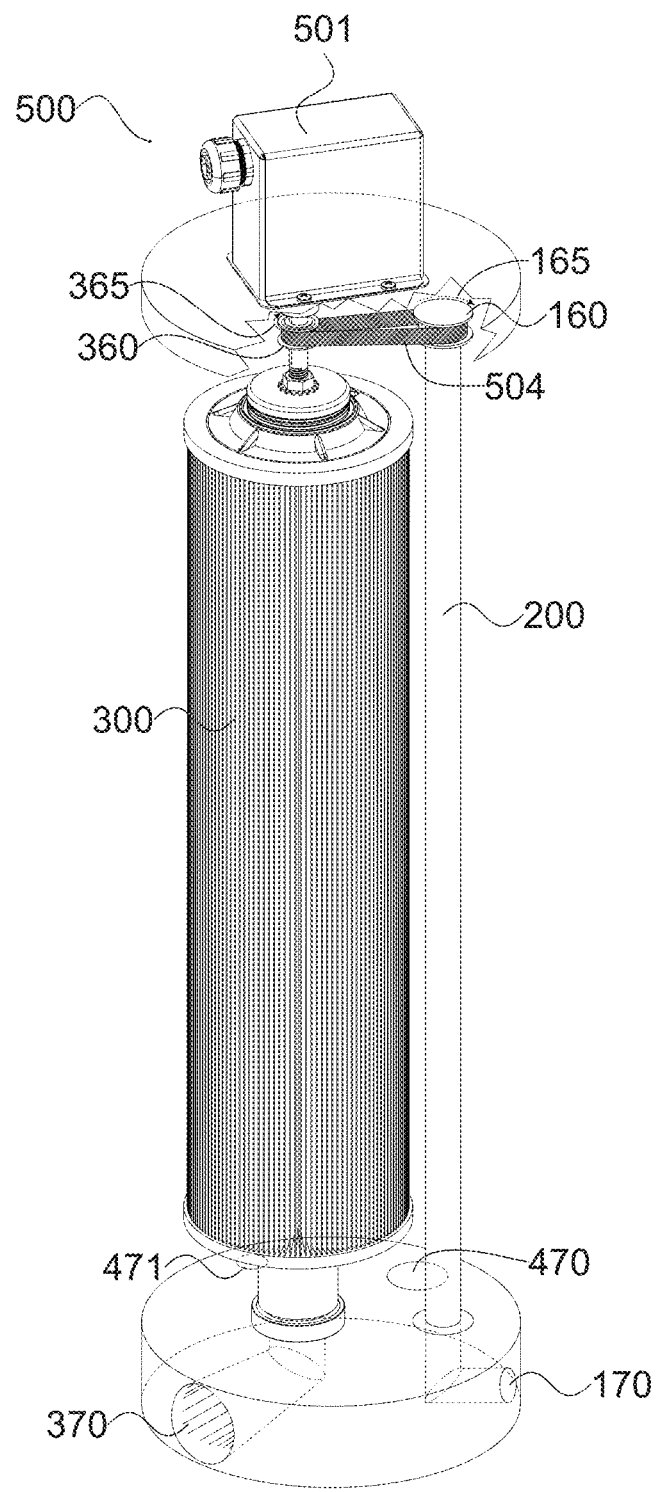
FIG. 9 shows an example of applying rotational force to the first drive attachment and the third drive attachment using a belt and only a single motor.

The source of the first rotational force 165 and the third rotational force 365 may be a motive power source 500 as shown in FIG. 1 and in FIG. 2. In FIG. 8, the motive power source 500 is a single motor 501. In FIG. 9, only a single motor 501 produces both the first rotational force 165 and the third rotational force 365. In FIG. 9, the single motor 501 applies the third rotational force 365 directly to the third structure 300 and applies the first rotational force 165 indirectly to the first structure 100. In an alternative embodiment, the single motor 501 applies the first rotational force 165 directly to the first structure 100 and applies the third rotational force 365 indirectly to the third structure 300.

In FIG. 9, a rotational force, such as the first rotational force 165 or the third rotational force 365, is applied indirectly, via a drive belt 504, to one of the first drive attachment 160 and the third drive attachment 360. In an embodiment, both rotational forces are applied indirectly to the respective drive attachments. In an alternative embodiment, the drive belt 504 may be replaced by a gear or a system of gears. In another alternative embodiment, the drive belt 504 may be replaced by one or more cogs in a clockwork fashion.

Figure 10:
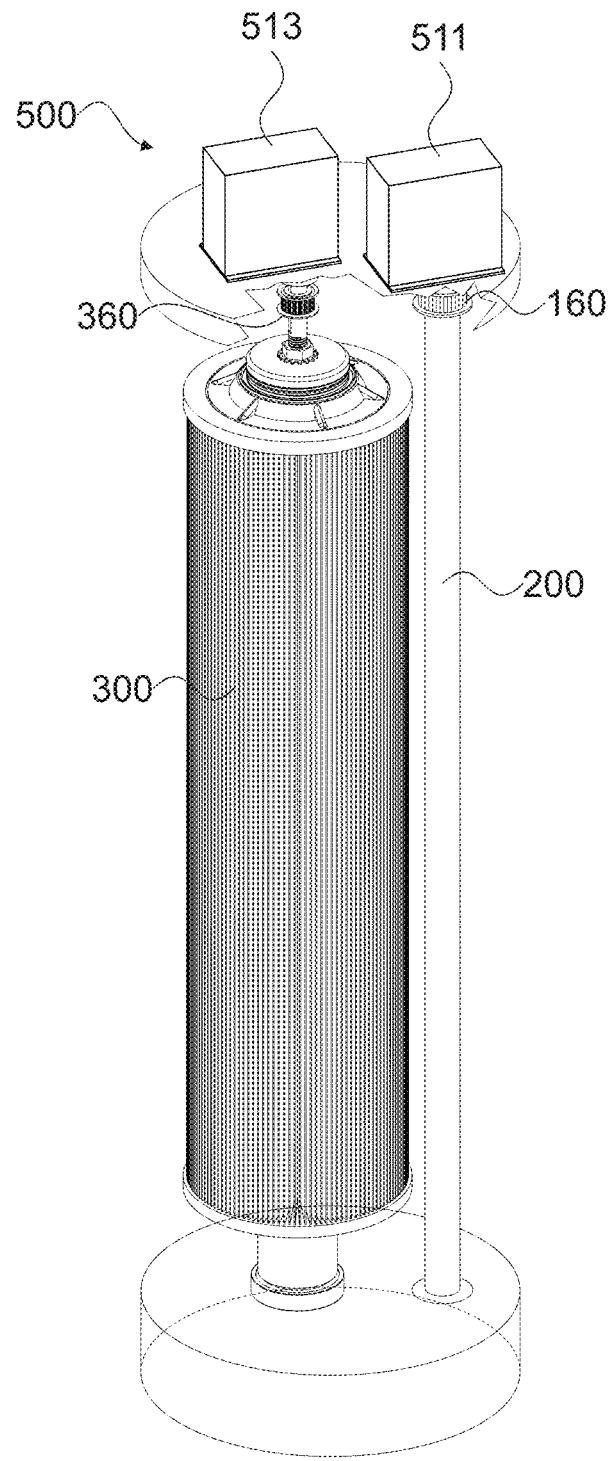
FIG. 10 shows an example of using more than one motor to apply the rotational force to the first structure and the third structure.

In the alternative cleaning system shown in FIG. 10, the motive power source 500 includes a first motor 511 to supply the first rotational force 165 and a second motor 513 to supply the third rotational force 365, allowing for finer control over the rotation speed of the first structure 100 relative to the third structure 300.

In FIG. 9, the housing includes a base portion with fluid ports to allow fluid to flow into or out of the apparatus 10. As shown in FIG. 9, the first structure 100 (inside second structure 200) is coupled to a fluid port, hereafter referred to as a first fluid port 170, to receive fluid for use in a cleaning operation. The housing 400 is coupled to a fluid port, hereafter referred to as second fluid port 470, to allow fluid to be filtered to flow into the housing 400. The third structure 300 is coupled to a fluid port, hereafter referred to as a third fluid port 370, to allow fluid that has been filtered to exit the apparatus 10. The housing 400 is further connected to a fourth fluid port 471 to act as a drain. A filter vent port provided in the housing 400 is provided to allow undesired fluid, such as atmospheric gas, to be released to outside, as described below.

Figure 11:
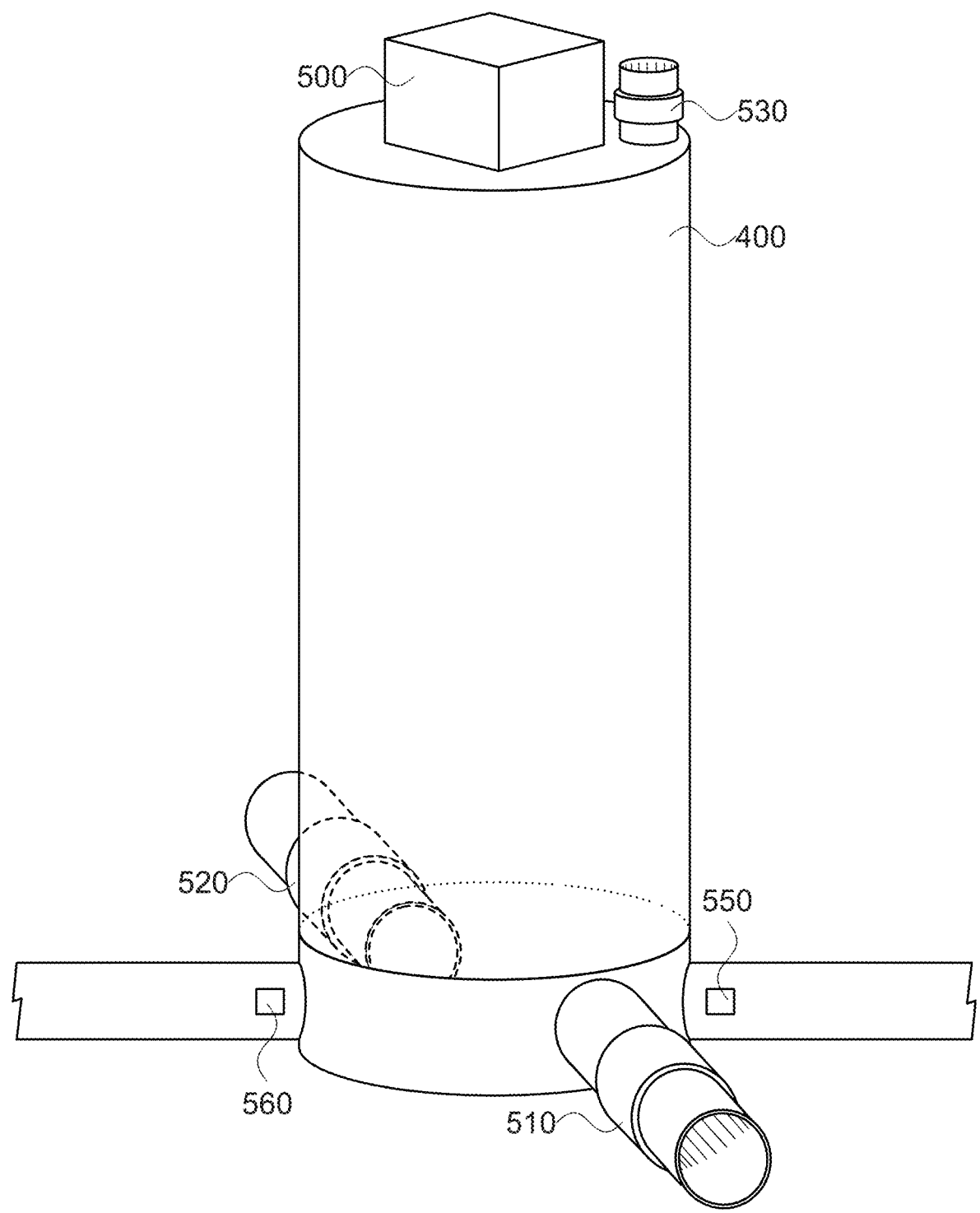
FIG. 11 shows an example of a filter system connected to pipes and various flow control components, in an embodiment.

The first fluid port 170, in an embodiment, connects to a nozzle unit valve 510 as shown in FIG. 11. The nozzle unit valve 510 controls the flow of fluid through the first fluid port 170 and into the first structure 100. The fourth fluid port 471, in an embodiment, connects to a drain valve 520. The third fluid port 370 and the second fluid port 470 are connected to outlet and inlet pipes, respectively. In FIG. 11, an inlet port pressure sensor 550 senses an inflow pressure of the fluid at the second fluid port 470. An outlet port pressure sensor 560 senses an outflow pressure of the fluid at the third fluid port 370. The pressure relief valve 530 shown in FIG. 11 controls the flow through the filter vent port in the housing 400.

Figure 12:
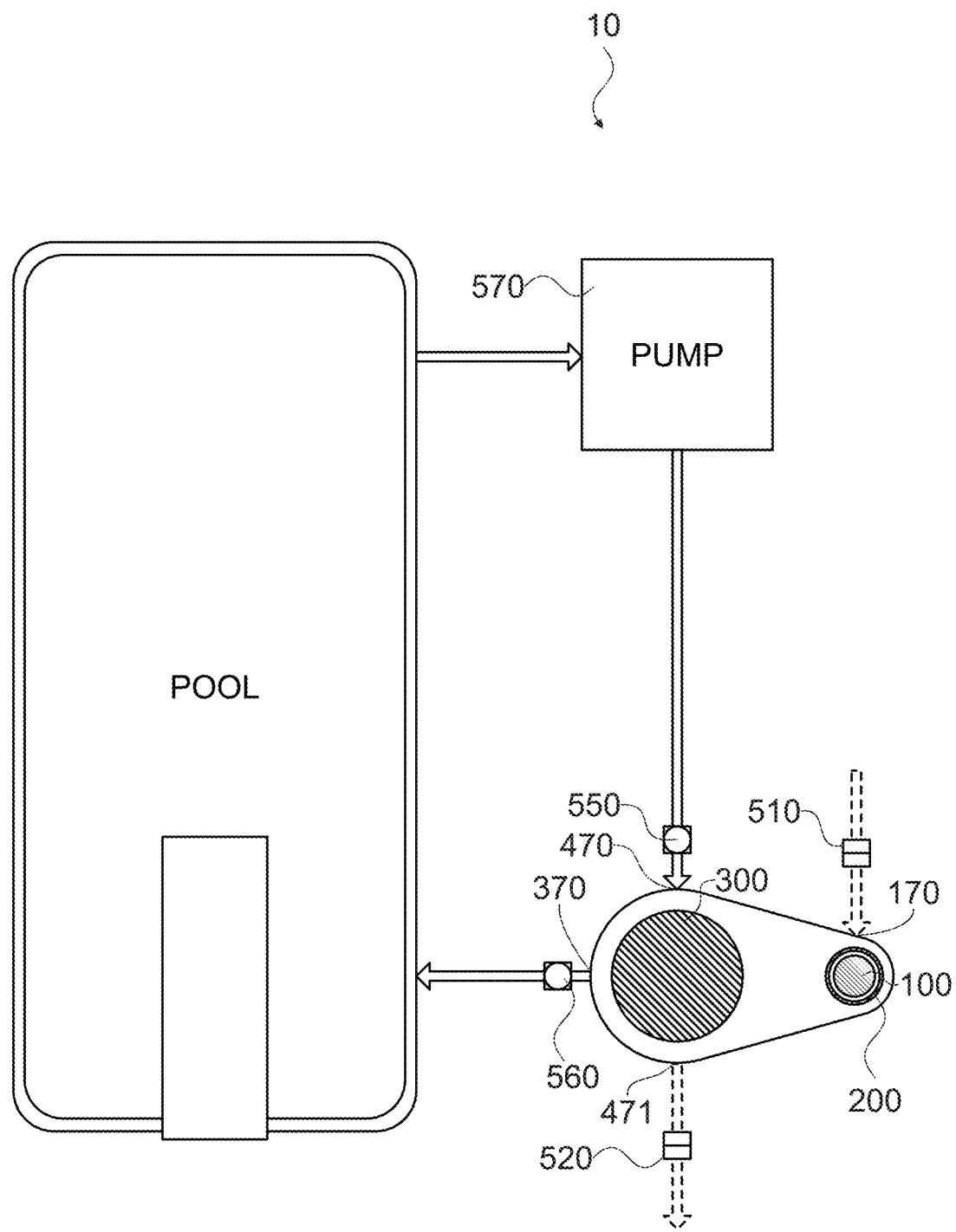
FIG. 12 shows an example of a filter system as used in an aquatic water system, in a normal mode of operation.

The pool in FIG. 12 is an example of an aquatic water reservoir. In the example shown in FIG. 12, a pump 570 is operable in a normal mode to move the fluid along a path, referred to hereafter as a first fluid path, that includes the second fluid port 470 which is the inlet to the housing 400. The fluid in the housing passes through the third part 345 of the third structure 300, which is the filter portion of the filter unit, and also part of the first fluid path. The fluid continues along the first fluid path through the third fluid port 370 which is the outlet from the housing 400 and leads back to the reservoir. In this normal mode, the nozzle unit valve 510 prevents fluid from entering through the first fluid port 170 and the drain valve 520 prevents fluid from leaving through the fourth fluid port 471. In other words, the nozzle unit valve 510 is closed, the drain valve 520 is closed, the pressure relief valve 530 is closed, the pump 570 propels the fluid along the first fluid path, and the motive power source 500 does not apply the first rotational force 165 or the third rotational force 365.

Figure 13:
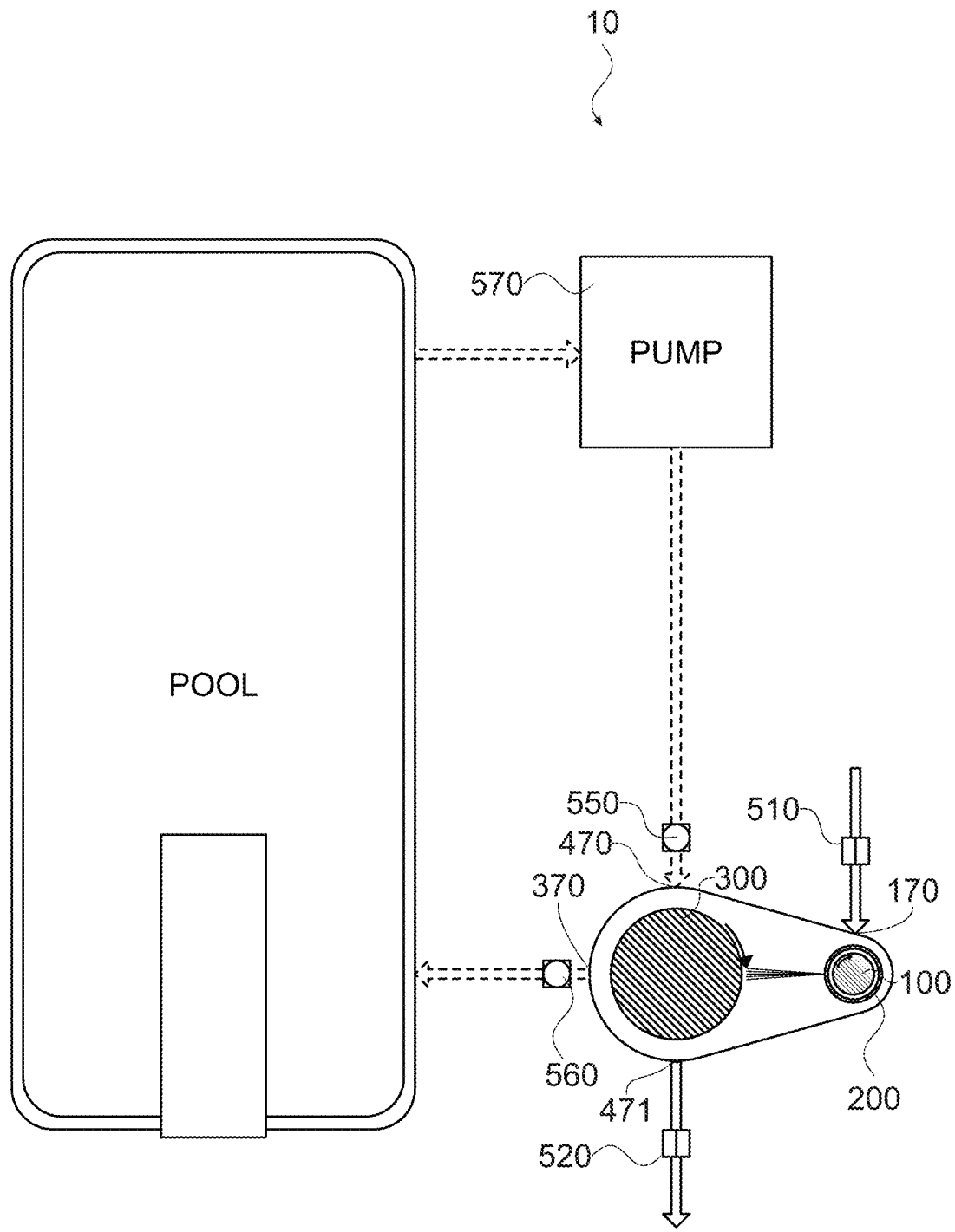
FIG. 13 shows an example of a filter system as in FIG. 12, but in a cleaning mode of operation.

A cleaning operation is depicted in FIG. 13, in which the pump 570 is deactivated. Because the pump 570 does not push the fluid along the first fluid path, the fluid does not flow along this path; it remains generally stationary. During the cleaning operation, the nozzle unit valve 510 is open and fluid enters the first structure 100 and exits as a jet through the second structure 200. The drain valve 520 is open so that debris cleaned from the third structure 300 exits the housing 400. The motive power source 500 applies the first rotational force 165 to the first structure 100 and the third rotational force 365 to the third structure 300.

The nozzle unit valve 510, the drain valve 520, the pressure relief valve 530, the inlet port pressure sensor 550, the outlet port pressure sensor 560, and the pump 570 may be thought as a set of flow components 580. The flow components 580 are controllable by the flow control system 600 shown in FIG. 1 and in FIG. 2. The flow control system 600 is operable to communicate with the set of flow components 580. In an embodiment, the communication is through wires. In another embodiment, the communication is through Wi-Fi, Bluetooth, and/or cellular signals.

Figure 14:
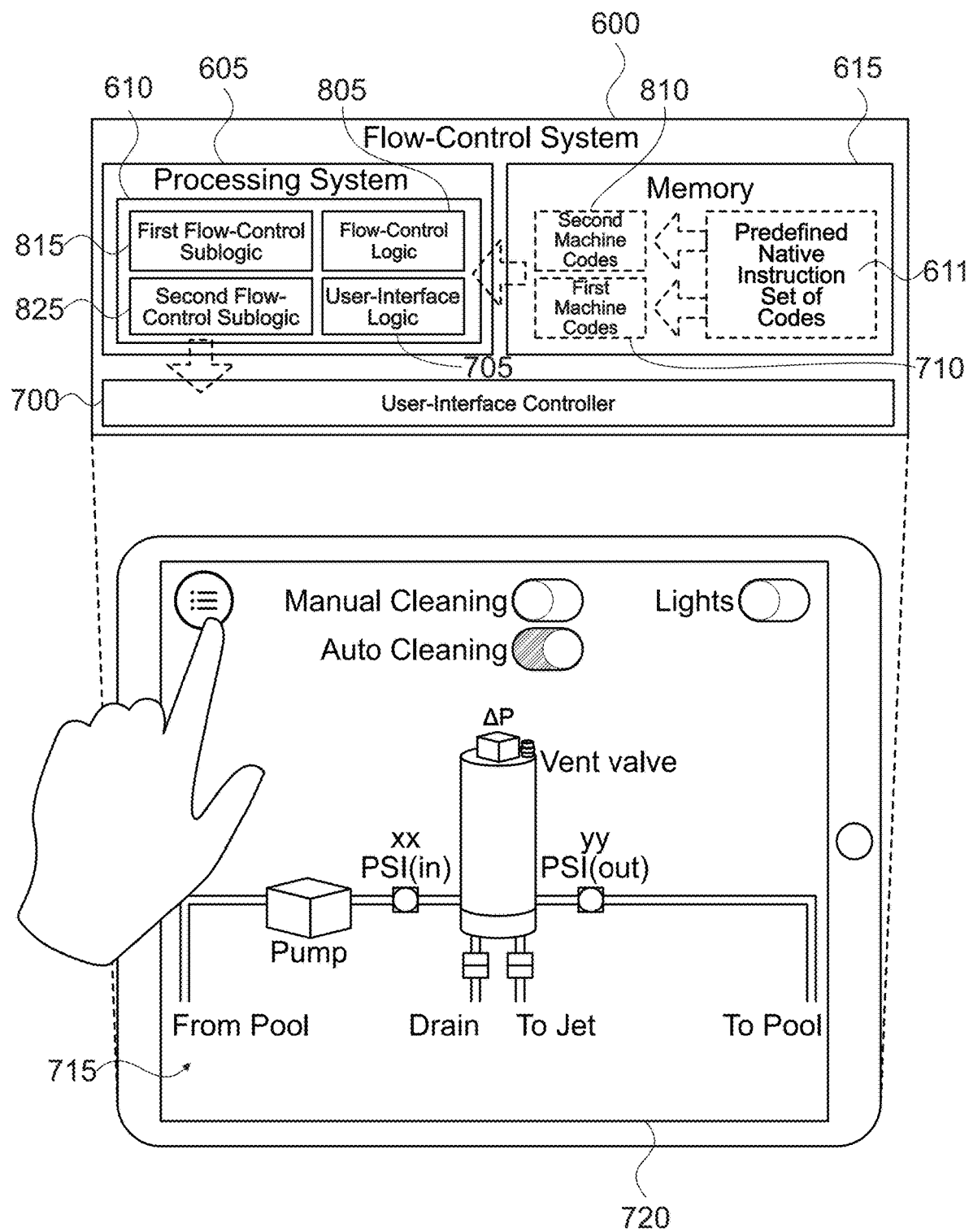
FIG. 14 shows a highly simplified, schematic and pictorial depiction of an embodiment of a flow control system that controls the operation of the various flow control components.

An embodiment of the flow control system 600 is illustrated in FIG. 14. In FIG. 14, the flow control system 600 includes a processing system 605, a memory 615, a user-interface controller 700, and a flow control display 720.

One embodiment of the flow control system 600 is realized in a computer system. Here, the term "computer system" is to be understood to include at least a memory and a processing system. In general, the memory will store, at one time or another, at least portions of an executable program code, and the processing system will execute one or more instructions included in that executable program code. It will be appreciated that the term "executable program code" and the term "software" mean substantially the same thing for this description. The processing system includes at least one hardware processor, and in other examples includes multiple processors and/or multiple processor cores. The processing system in yet another example includes processors from different devices working together.

In one example, the flow control system is embodied in a computer program product. A computer program product is an article of manufacture that has a computer-readable medium with software adapted to enable a processing system to perform various operations and actions.

On a practical level the software, that enables the computer system to perform the operations described herein, is supplied in many forms. The actual implementation of the approach and operations of the flow control system are at one time statements written in a computer language. Such computer language statements, when made executable by a computer and then executed by the computer, cause the computer to act in accordance with the particular content of the statements. The software that enables a computer system to act in accordance with the inventive concept is provided in any number of forms including, but not limited to, original source code, assembly code, object code, machine language, compressed or encrypted versions of the foregoing, and any equivalents.

Software is stored on a computer-readable medium. Some computer-readable media are transitory, and some are non-transitory.

An example of a transitory computer-readable medium is the buffers of transmitters and receivers that briefly store only portions of software when the software is being downloaded over the Internet. Another example of a transitory computer-readable medium is a carrier signal or radio frequency signal in transit that conveys portions of software over the air or through cabling when the software is being downloaded. Another example of a transitory computer-readable medium is the processor buffers and cache into which portions of software are loaded for immediate execution.

Non-transitory computer-readable media are different from transitory computer-readable media in terms of the amount of software stored and the duration of the storage. Non-transitory computer-readable media hold the software in its entirety, and for longer duration, as opposed to transitory computer-readable media that hold only a portion of the software and for a relatively short time. The term, "non-transitory computer-readable medium," specifically excludes communication signals such as radio frequency signals in transit.

Examples of non-transitory computer-readable media include portable storage such as a diskette, a tape, a compact disc, an optical disc, a USB disk, a USB stick, a flash disk, an external SSD, a compact flash card, an SD card, and the like. Other examples of non-transitory computer-readable media include secondary storage such as an internal hard drive, an internal SSD, internal flash memory, internal non-volatile memory, internal DRAM, ROM, RAM, and the like. Another example of non-transitory computer-readable media is the primary storage of a computer system when large enough to store and when used to store all of a given software. Yet other examples may be developed in the future.

Although the software is "written on" a disc, "embodied in" an integrated circuit, "carried over" a communications circuit, "stored in" a memory chip, or "loaded in" a cache memory, it will be appreciated that, for this application, the software will be referred to simply as being "in" or "on" the computer-readable medium. The terms "in" or "on" are intended to encompass the above mentioned and all equivalent and possible ways software is associated with a computer-readable medium. Likewise, a computer-readable medium is said to "hold," to "have," to "store," or to "bear" the software.

For simplicity, therefore, the term "computer program product" is used to refer to a computer-readable medium, which bears any form of software to enable a computer system to operate according to any embodiment of the inventive concept.

The flow control system is also embodied in a user interface responsive to user inputs to invoke one or more operations by an application program. A user interface is any hardware, software, or combination of hardware and software that allows a user to interact with a computer system. For this discussion, a user interface includes one or more user interface objects. User interface objects include display regions, user activatable regions, and the like.

A display region is a region of a user interface which displays information to the user. A user activatable region is a region of a user interface, such as a button or a menu, which allows the user to take some action. A display region and a user activatable region are, in some examples, collocated, overlapping, or reside one within the other.

A user interface is invoked by an application program. When an application program invokes a user interface, it is typically for interacting with a user.

It is unnecessary, however, for the inventive concept, that an actual user ever interact with the user interface. It is also unnecessary, for the inventive concept, that an interaction with the user interface be performed by an actual user. In some examples, the user interface interacts with another program, such as a program to simulate the actions of a user with respect to the user interface.

Therefore, as used herein, "user" means an actual person or a program interacting with a user interface.

The interrelationship between the executable software instructions and the hardware processor is structural. The instructions per se are simply a series of symbols or numeric values that do not intrinsically convey any information. It is the hardware processor, which by design was preconfigured to interpret the symbols or numeric values that imparts meaning to the instructions.

The hardware processor is configured when designed so as to perform a predefined set of basic operations in response to receiving a corresponding basic instruction selected from a predefined native instruction set of codes.

The software modules or logic must be made executable before the hardware processor can perform the operations designed into the software. The process of making the logic executable by a hardware processor, a process known to those familiar with this technical field as compilation or interpretation, is not the subject of this application and is well known in the field, and therefore will not be described in any detail here. When logic is made executable for a hardware processor, the logic is necessarily changed into machine codes that are selected from the predefined native instruction set of codes that can be carried out by the hardware processor.

The logic described below, when made executable, therefore includes a respective set of machine codes selected from the native instruction set.

The foregoing points apply by analogy to application-specific integrated circuits, field programmable gate arrays, and the like, all of which embody logic executable by a hardware processor.

Returning to FIG. 14, showing an embodiment of a flow control system 600, the processing system 605 includes a hardware processor 610. The hardware processor 610 is operable to perform a predefined set of basic operations in response to receiving a corresponding basic instruction selected from a predefined native instruction set of codes 611. The memory 615 is accessible to the processing system 605.

The memory stores first machine codes 710 and second machine codes 810. The first machine codes 710 are selected from the predefined native instruction set of codes 611 of the hardware processor 610, as are the second machine codes 810.

In FIG. 14, user-interface logic 705 includes first machine codes 710 which are adapted to operate with the user-interface controller 700 to implement a user interface 715 on the flow control display 720. An example of a user interface 715 includes a display area that shows the present status of the apparatus 10. The user interface 715 also includes user-activatable display regions such as a menu, a manual cleaning start button, an auto cleaning on/off button, and one or more auxiliary buttons to control other features that are interfaced with the flow control system 600 such as pool lights, a spa circulation feature, a spa whirlpool feature, a pool heater, and the like.

The flow-control logic 805 includes second machine codes 810 which are adapted to interact with the set of flow components 580 and with the motive power source 500. In an embodiment, the flow-control logic 805 includes first flow-control sublogic 815 and second flow-control sublogic 825. The first flow-control sublogic 815 controls the flow components 580 and the motive power source 500 to open, close, activate, or deactivate at timings and in an order to implement a normal operation such as that illustrated in FIG. 12. The second flow-control sublogic 825 controls the flow components 580 and the motive power source 500 to implement a cleaning operation such as that illustrated in FIG. 13.

Figure 15:
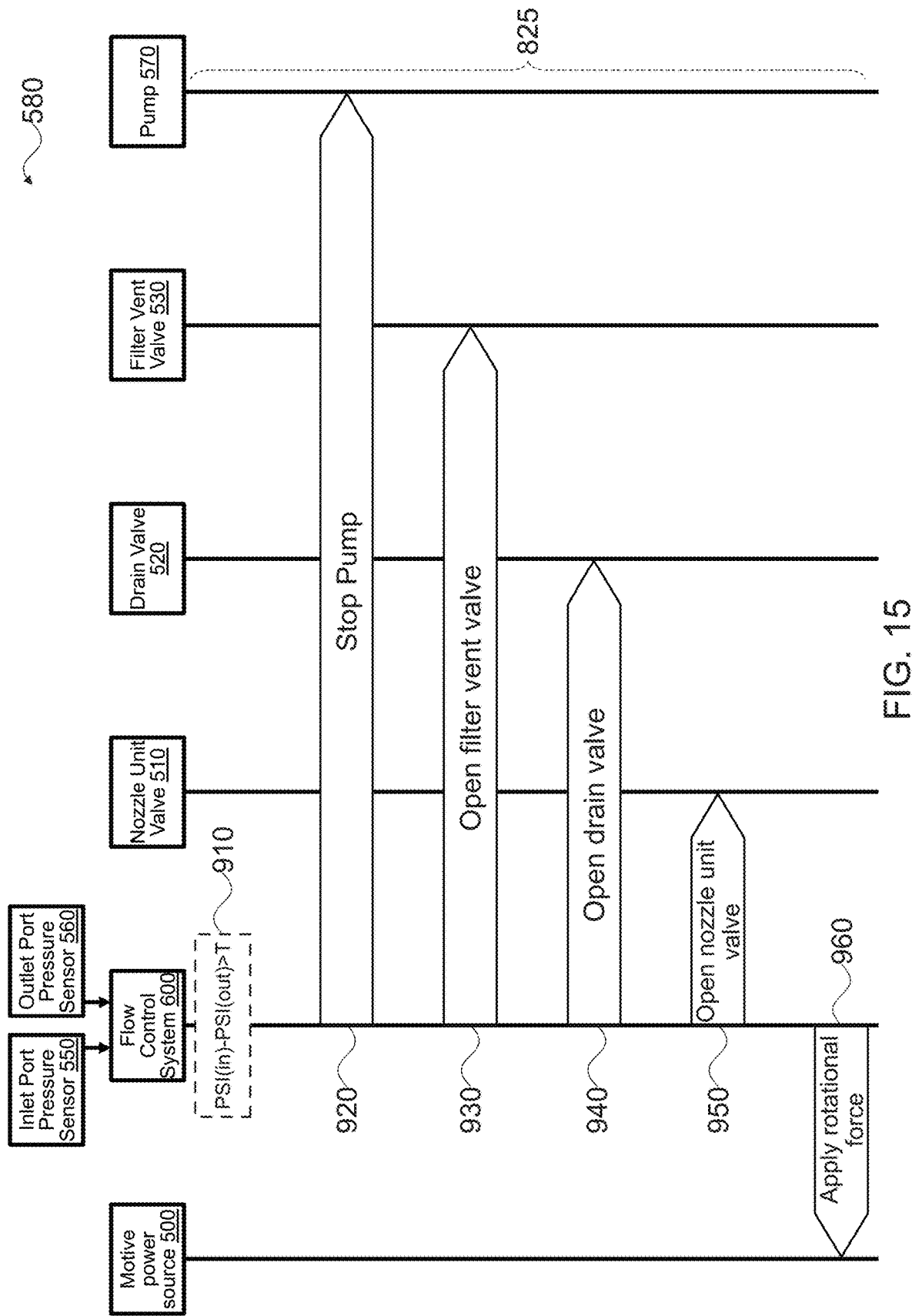
FIG. 15 illustrates the steps of an algorithm for implementing a cleaning operation and how the flow control system interacts with the flow control components when performing such an algorithm.

An embodiment of an algorithm for implementing the second flow-control sublogic 825 is illustrated in FIG. 15. The flow components 580 appear across the top of the drawing. Here, the flow control system 600 monitors a value PSI(in) provided by the inlet port pressure sensor 550 and a value PSI(out) provided by the outlet port pressure sensor 560. When the difference between the two values, which may be referred to as ΔP, exceeds a predetermined threshold T, the flow control system 600 may initiate a cleaning operation. The calculation of ΔP may be performed by the flow control system 600 in a pressure comparison step 910. The user interface 715 displayed on the flow control display 720 may include a display area in which the value of ΔP is shown, as depicted in FIG. 14.

In addition to performing the cleaning operation as just mentioned, or as an alternative, the cleaning operation may be initiated manually by an operator or may be automatically initiated according to a schedule. The manual initiation of cleaning may, for example, be initiated using the flow control system 600 via the user interface 715 shown on the flow control display 720. In FIG. 14, for example, the user interface 715 includes a display area labeled "Manual Cleaning" and a user activatable area, to the right of the label, with which a user may interact to initiate the cleaning operation or to terminate a cleaning operation. The entry of a schedule of times for cleaning may, for example, be accomplished via a functional menu that may be accessed by a user by pressing a user activatable area as depicted in FIG. 14, where the left index finger of a user is shown overlapping part of such a user activatable area.

When the determination, in the pressure comparison step 910 (or in a step that determines whether a manual cleaning operation is requested, or in a step that determines that a scheduled cleaning operation is due), is that the cleaning operation is to be performed, processing may continue with a pump-stop step 920. In the pump-stop step 920, the pump 570 may be deactivated so that fluid no longer flows along the first fluid path. Shortly thereafter, the flow control system 600 may implement an open filter vent valve step 930 to cause the pressure relief valve 530 to open. Opening the pressure relief valve 530 allows the fluid standing in the housing 400 to exit through the third structure 300 and the third fluid port 370 so as to avoid wasting this fluid. Once the housing 400 has emptied its fluid through the third fluid port 370, the flow control system 600 may command the drain valve 520 to open in an open drain valve step 940. Next, the flow control system 600 may perform an open nozzle unit valve step 950 to open the nozzle unit valve 510 so that fluid may flow into the first structure 100. After the open drain valve step 940, the flow control system 600 may also perform an apply rotational force step 960 so that the first structure 100 is rotated about the first longitudinal axis 130 by the first rotational force 165 and so that the third structure 300 is rotated about the third longitudinal axis 330 by the third rotational force 365.

Figure 16:
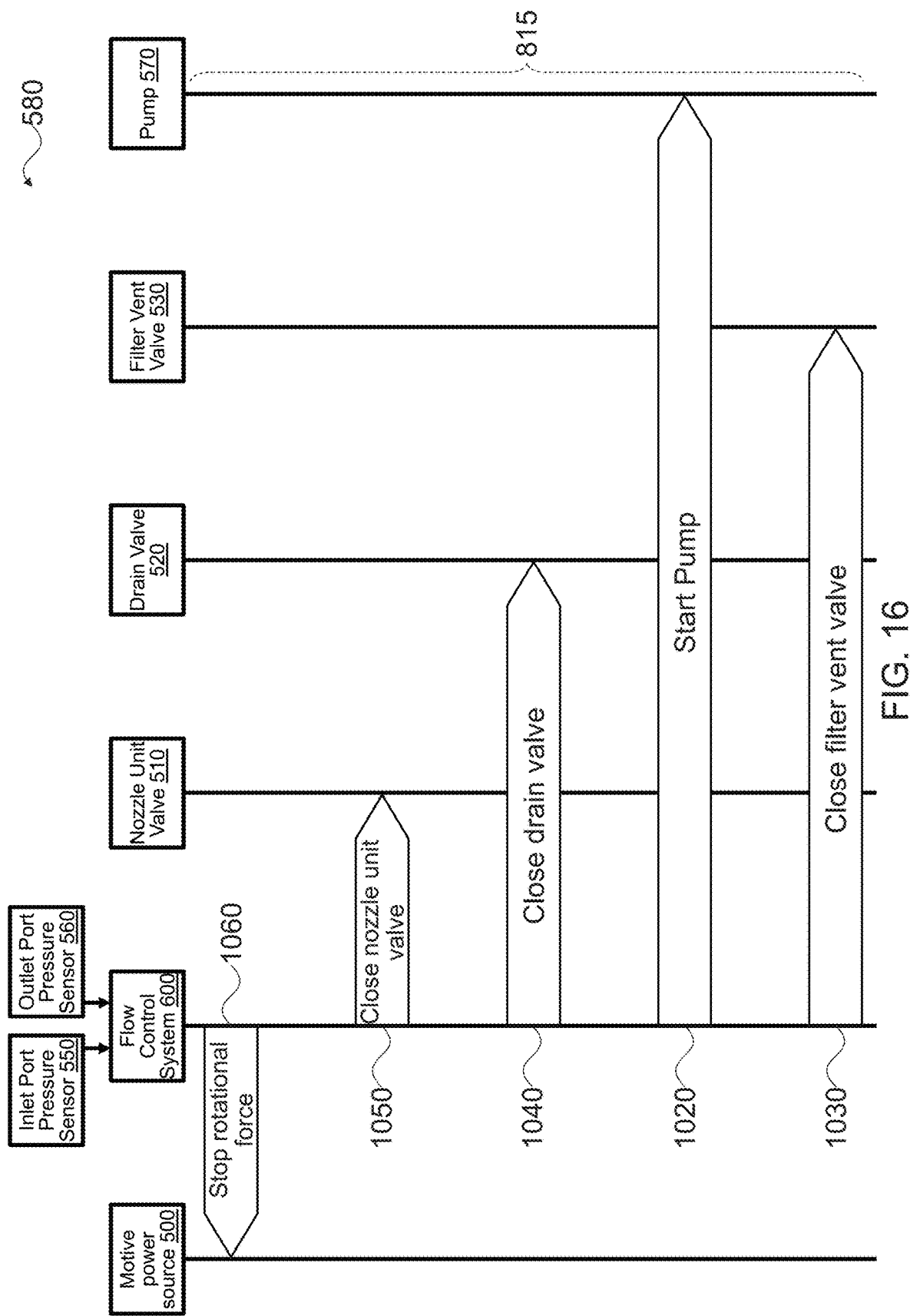
FIG. 16 illustrates the steps of an algorithm for implementing a normal operation and how the flow control system interacts with the flow control components when performing such an operation.

Once the cleaning operation is concluded, which may be determined in one embodiment by the passage of a predetermined amount of time, processing by the flow control system 600 may continue to restore a normal operation mode as shown in FIG. 16.

An embodiment of an algorithm for implementing the first flow-control sublogic 815 is illustrated in FIG. 16. In FIG. 16, when restoring the normal operation after a cleaning operation, the flow control system 600 executes a stop rotational force step 1060 so that the first structure 100 and the third structure 300 do not receive the first rotational force 165 or the third rotational force 365 from the motive power source 500. At or about the same time, the flow control system 600 performs a close nozzle unit valve step 1050 to close the nozzle unit valve 510 so that fluid no longer enters the first structure 100 through the first fluid port 170. The flow control system 600 implements a close drain valve step 1040 to close the drain valve 520 so that fluid no longer exits the housing 400 via the fourth fluid port 471. The flow control system 600 causes the pump 570 to start in a pump-start step 1020. The pump 570 begins to push fluid through the system: through the second fluid port 470, into the housing 400, through the sheet 375 in the third part 345 of the third structure 300, where any particles larger than the third openings 350 are trapped, out the center part of third structure 300 via the third fluid port 370, and so on. As the foregoing steps occur, a water level within the housing 400 begins to rise, displacing the atmosphere or other gas or other fluid from inside the housing 400 to the outside via the pressure relief valve 530. The flow control system 600 closes the pressure relief valve 530 in a close filter vent valve step 1030 after the pressure in the housing 400 has been stabilized, for example by venting to the outside or after a certain passage of time.

In the foregoing teaching example, there may be no need for a caretaker to take any action to maintain the third structure 300 in a sufficiently clean state. The flow control system 600 senses when a cleaning operation is required, due to its analysis of the values received from the inlet port pressure sensor 550 and the outlet port pressure sensor 560, and orders the cleaning operation as and when required. The cleaning operation takes place with the filter, the third structure 300, in situ; the filter need not be removed to be cleaned.

Furthermore, in an embodiment, the flow control system 600 initiates the cleaning operation under timing constraints that are customizable by a user. For example, a user can interact with the user interface 715 to set certain times as quiet hours during which the cleaning operation must not take place. In another embodiment, the user may interact with the user interface 715 to set certain times as quiet hours during which, after the cleaning operation takes place, the pump must not be restarted.

In the teaching example just presented, the fluid for cleaning the third structure 300 is supplied via a hose or a pipe from the house water of a nearby dwelling. Using a separate supply of fluid for cleaning conserves the already-treated water from the aquatic water reservoir such as a pool. If the pool water were used to clean the third structure 300 and subsequently removed from the system through the fourth fluid port 471 and the drain valve 520, replacement water would need to be supplied. This replacement water would be untreated water and may be in volume large enough to require the addition of water treatment chemicals or at least water testing to determine whether treatment was made necessary by the introduction of the untreated water.

DISCUSSION OF ALTERNATIVES

In the teaching example just presented, the apparatus 10 cleans fluid for use in a recreational aquatic water system. As can be seen in FIG. 12, the water to be filtered is output, after filtration, back into the same reservoir from which it was drawn.

In an alternative implementation, the apparatus 10 cleans fluid for use in a drinking water system. In this alternative implementation, after being filtered, the fluid does not return into the same reservoir from which it was drawn. Rather, the filtered water is pushed by the pump 570 to a destination suitable for supplying drinking water to its intended user community. In one example, the filtered water may proceed to a clean water reservoir. In another example, the filtered water may be supplied via pipes to homes.

In yet another alternative implementation, the apparatus 10 is physically located at an altitude lower than a reservoir that supplies water to be cleaned, and an altitude higher than a destination to which the filtered water is to be supplied. In this instance, gravity may push the fluid through the system instead of a pump 570. In such an example, the pump-stop step 920 and the pump-start step 1020 are replaced by an inlet valve close step and an inlet valve open step, respectively.

In the teaching example described above, the fluid that enters the first structure 100 is water supplied through a hose connected to a typical dwelling. The typical dwelling has water pressure sufficient to cause the jet emitted from the first structure 100 and second structure 200 to impact the third structure 300 with enough strength to yield excellent cleaning results. The pump 570 need not be activated for the cleaning operation and the resulting system is simpler overall.

In an alternative implementation, however, the water pressure of the dwelling might be too low. The dwelling itself might not be available. In this situation, the pump 570, instead of the water supply of the dwelling, pushes the water into the first structure 100 via an additional pipe or hose that connects to the pump through an additional valve or the like.

In the teaching example above, the apparatus 10 is permanently installed in a fixed location.

Figure 17:
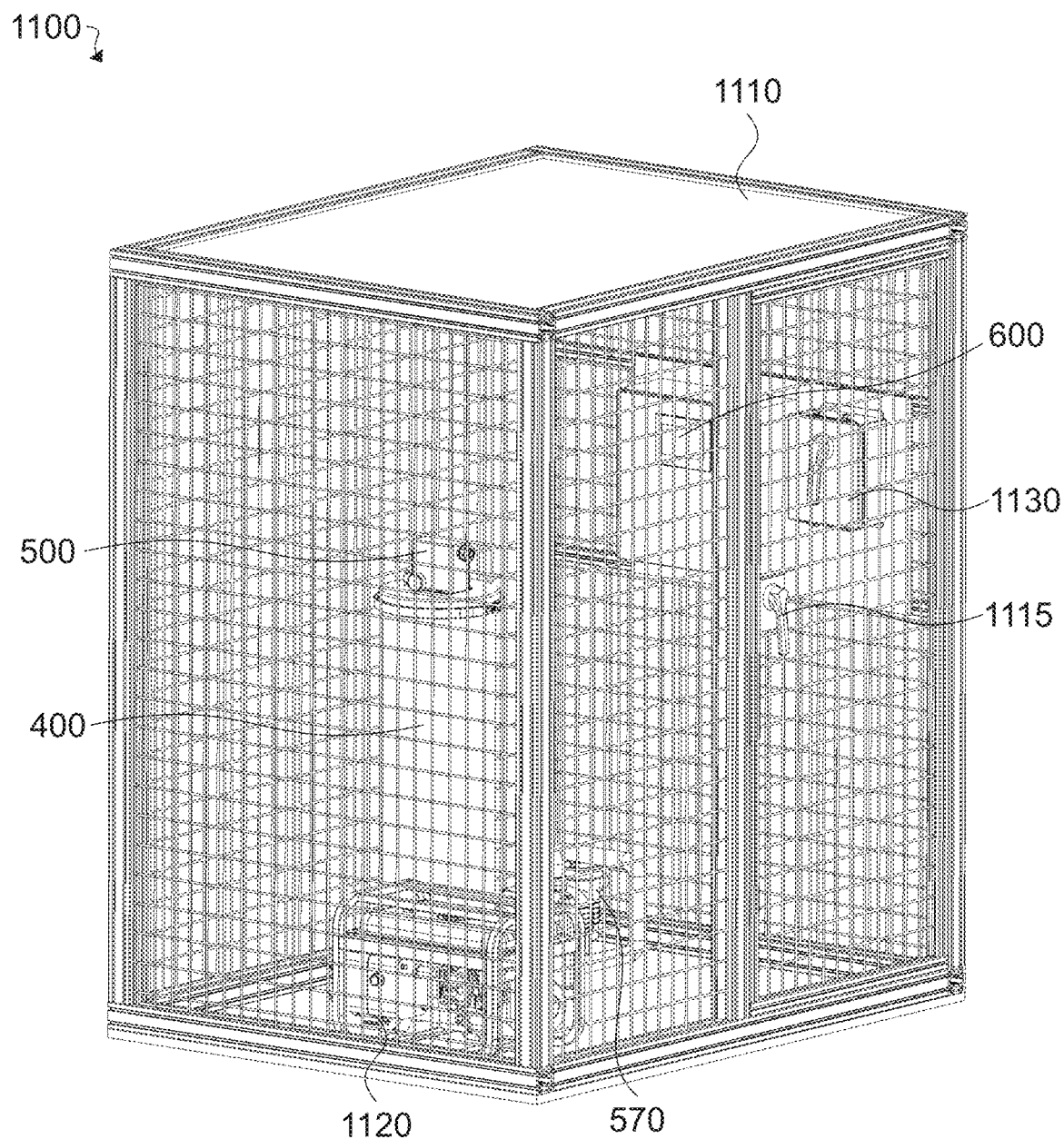
FIG. 17 illustrates an assembly that includes the cleaning system, configured for rapid deployment.
Figure 18:
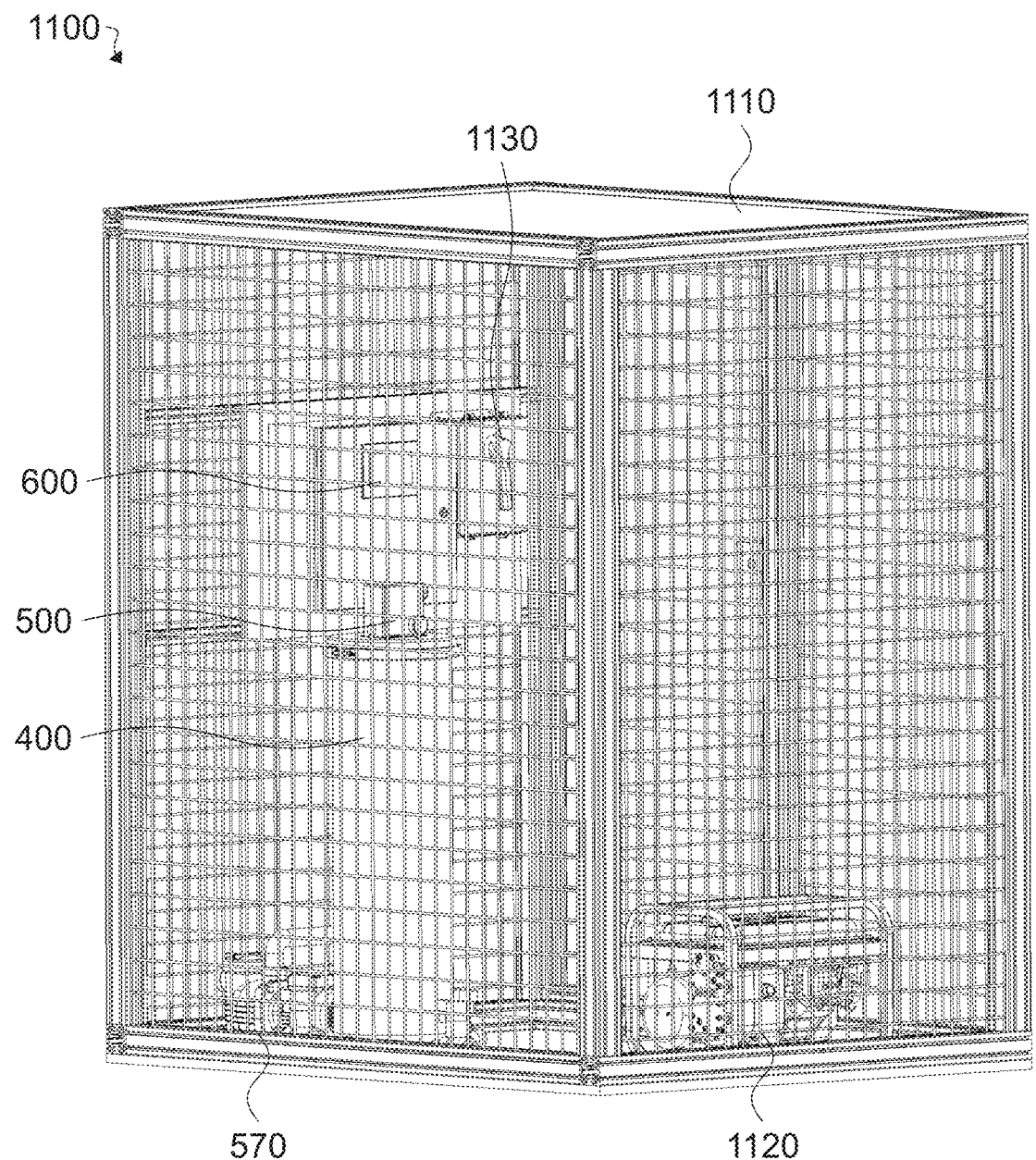
FIG. 18 illustrates, from another angle, a view of the assembly of FIG. 17.

Turning to FIGS. 17 and 18, there is shown an alternative implementation in which the apparatus 10 is installed on a movable platform sized to be transported on an airplane or the bed of a truck. In FIGS. 17 and 18, a container assembly 1100 includes a container 1110 that protects its contents from unauthorized access but permits authorized access via a door 1115. The container assembly 1100 may include an electrical power source 1120 such as a generator to supply power to the flow components 580, the flow control system 600, and the like. A power control panel 1130 may be provided to enable convenient on/off control over a connection between the electrical power source 1120 and elements that receive power from it. In an alternative implementation, the electrical power source 1120 is omitted when local electrical power is available to connect through the power control panel 1130.

The container 1110 may be equipped with a door 1115 that is lockable to prevent unauthorized persons and wild animals from accessing and interfering with the equipment. As such, the container 1110 may include a base, cage-type walls that facilitate airflow, and a metal roof. As mentioned above, the electrical power source 1120 is not strictly necessary where power is available and reliable. Where power is unreliable or intermittent, the use of the electrical power source 1120 may enable a reliable supply of filtered water notwithstanding the unreliability of the power supply.

This alternative implementation of the apparatus 10 may be useful in providing drinking water in remote, undeveloped, or under-resourced areas. Because the container assembly 1100 is sized for transport on a truck and/or in an airplane, the systems may be manufactured in industrialized areas and installed worldwide wherever water to be filtered is available.

In another alternative embodiment, an input-side reservoir may be provided within the cage so that the pump 570 always has at least a minimum amount of water or other fluid and may not have to be primed in the event of an unpredictable flow of water to the input side. In this instance, the input-side reservoir may include a sensor that can generate an indication to the flow control system 600 when a level of water within the input-side reservoir falls below a predetermined level. Because the input-side reservoir avoids the need for a maintenance visit to re-prime the pump in the case of irregular or unpredictable water supply, the apparatus 10 can be conveniently used in even more situations.

In another alternative embodiment, the apparatus 10 is mounted on a towable trailer together with an output-side reservoir. The trailer may be deployed to areas that have a supply of water but not a supply of drinkable water. In this instance, the water, after filtration, may be stored in the output-side reservoir so that a large supply of drinkable water is provided.

This alternative embodiment may be especially useful in disaster-relief scenarios where the supply of water to homes is interrupted or where people who need drinking water cannot access it because the disaster has displaced the people from their homes.

In the teaching example previously discussed, the apparatus 10 cleans aquatic water for recreational use and is typically installed outdoors.

In an alternative implementation, the apparatus 10 cleans drinking water within the home. Home water filtration systems often require homeowners to frequently replace water filters, at a cost that grows ever larger as time passes. The apparatus 10 represents a solution where the water filter is cleaned in-situ instead of being replaced.

In this implementation, the flow of water through the system in normal operation does not require the pump 570. Instead, a valve controllable by the flow control system 600 may be used during a cleaning operation to direct the supply of water to the first fluid port 170 instead of to the second fluid port 470. The fourth fluid port 471 may optionally connect, via the drain valve 520, to the sump pump of the home so that the water and debris used during the cleaning operation may be pumped outside of the house. The fourth fluid port 471 may optionally connect to the sewer system via the wastewater pipe system of the house.

Because house water pressure is sufficient to push the water through the apparatus 10 in the normal operation mode and is sufficient to emit a strong cleaning jet during the cleaning operation mode, both modes can be performed without the use of a pump 570, in this alternative implementation.

In an embodiment, the flow control system 600 further includes an access point for data communications. The access point (AP) may be a wireless outdoor AP under control of the processing system 605. The wireless outdoor AP may be adapted to connect to a network such as a local area network (LAN) via Wi-Fi, and/or to a cellular data network via a 2G/3G/4G/5G connection or the like. The AP may, in an embodiment, be configured as a repeater to join an existing Wi-Fi network to achieve Internet access. The AP may, in the container assembly 1100 embodiment, connect via satellite communications.

When equipped thus with network access, whether wired, wireless, cellular, or satellite, the processing system 605 may send and receive communications via the AP.

In one embodiment, the processing system 605 is configured to generate and to communicate email messages to one or more predetermined email addresses. In another embodiment, the processing system 605 communicates with a server of a monitoring service that itself generates and sends the email messages. The email messages may be alarm messages that indicate status information pertaining to the apparatus 10.

In an embodiment, the AP and/or the processing system 605 and memory 615 provide a virtual network computing (VNC) server that can be accessed by a client app such as a VNC viewer app. In this embodiment, a user can interact with the user interface 715 from a remote terminal accessible to the user, and the user thereby does not need to physically come into contact with the flow control display 720.

In an embodiment, the processing system 605 generates log files of events. An event may be, for example, a record of PSI(in) and PSI(out), and such events may be recorded in a log file of historical filter pressure data. Another example of an event is an operation such as when a cleaning cycle is executed, and such events may be recorded in an operations log file. These examples are not exhaustive. In an embodiment, the AP and/or the processing system 605 and memory 615 provide a server that supports the file transfer protocol (FTP). Using the FTP server capability allows for a user or a monitoring service to request and receive such log files. In one embodiment, the processing system 605 causes such log files to automatically be communicated to the user or a monitoring service without requiring a request to initiate such communication.

In another embodiment, the flow control system 600 implements an inter-device connection service (IDCS) that permits remote access for maintenance and support. In an embodiment, a maintenance and/or support service periodically updates software or firmware used in flow control system 600. The maintenance and/or support service may be provided by the same entity as the monitoring service provider or by a different entity such as a production facility or a factory. The maintenance and/or support service may use the IDCS to cause the software or the firmware updates to be applied to the flow control system 600.

CONCLUSION

The details presented above and in the drawing figures are shared to teach the inventive concepts, not to limit them. The extent and reach of the inventive concepts mentioned above should be ascertained from the appended claims.

What is claimed is:

1. An apparatus, comprising:
a first structure, a second structure, a third structure, a housing, a motive power source;
the first structure having a first outer surface, a first inner surface, and a first wall between the first inner surface and the first outer surface;
the first structure having a first inner space, defined by the first inner surface;
the first inner space having a first cylindrical chamber;
the first cylindrical chamber having a first longitudinal axis;
the first structure having a first outer diameter extending from the first outer surface and across the first cylindrical chamber in a first direction normal to the first longitudinal axis;
the first wall having a first part with one or more first openings, communicating between the first outer surface and the first cylindrical chamber, arranged in a first pattern, the first pattern approximating a helix about the first longitudinal axis;
the first structure having a first drive attachment transferring a first rotational force to the first structure;
the second structure having a second outer surface, a second inner surface, and a second wall between the second inner surface and the second outer surface;
the second structure having a second inner space, defined by the second inner surface;
the second inner space having a second cylindrical chamber;
the second cylindrical chamber having a second longitudinal axis;
the second structure having a second inner diameter extending from the second inner surface and across the second cylindrical chamber in a second direction normal to the second longitudinal axis;
the second wall having a second part with one or more second openings, communicating between the second outer surface and the second cylindrical chamber, arranged in a second pattern;
the second pattern being different from the first pattern and approximating a line parallel to the second longitudinal axis;
the second inner diameter accommodating the first outer diameter;
the first cylindrical chamber being disposed within the second cylindrical chamber;
the first pattern of the one or more first openings and the second pattern of the one or more second openings being positioned so that, when the first rotational force is applied to the first structure and fluid under pressure is introduced within the first structure, a jet of the fluid under pressure can escape through both the first structure and the second structure where the first openings align with the second openings;
the third structure having a third longitudinal axis parallel to the second longitudinal axis;
the third structure including a third part with third openings sized to filter particles from fluid passing through the third openings;
the third structure having a third drive attachment transferring a third rotational force to the third structure;
the housing having a bottom side and a top side, the bottom side of the housing including a base portion, the base portion of the housing having a plurality of fluid ports to allow fluid to flow into or out of the housing;
the housing enclosing at least:
the first part of the first wall of the first structure;
the second part of the second wall of the second structure; and
the third part of the third structure;
the motive power source operable to apply the first rotational force and the third rotational force;
the first structure being coupled to a first fluid port of the plurality of fluid ports;
the housing being coupled to a second fluid port of the plurality of fluid ports;
the third structure being coupled to a third fluid port of the plurality of fluid ports;
the housing being coupled to a fourth fluid port of the plurality of fluid ports;
the housing being coupled to a filter vent port;
the first part of the first structure comprising polyoxymethylene;
the polyoxymethylene providing a snug and slidable engagement between the first structure and the second structure and accommodating a film of fluid therebetween which acts as a lubricant between the first structure and the second structure; and
the motive power source comprising a first motor, at the top side of the housing, configured to apply the first rotational force, and a second motor different from the first motor, at the top side of the housing, configured to apply the third rotational force
wherein, within the housing, only one said jet is emitted at a time.

2. The apparatus of claim 1, further comprising:
a nozzle unit valve controlling a flow of the fluid through the first fluid port;
a drain valve controlling the flow of the fluid through the fourth fluid port;
an inlet port pressure sensor sensing an inflow pressure of the fluid at the second fluid port;

an outlet port pressure sensor sensing an outflow pressure of the fluid at the third fluid port;
a filter vent valve controlling flow through the filter vent port;
a pump operable to move the fluid along a first fluid path including the second fluid port, the third part of the third structure, and the third fluid port;
the nozzle unit valve, the drain valve, the inlet port pressure sensor, the outlet port pressure sensor, the filter vent valve, and the pump defining a set of flow components;
a flow control system operable to communicate with the set of flow components, the flow control system comprising:
   a processing system having a hardware processor operable to perform a predefined set of operations in response to receiving a corresponding instruction selected from a predefined native instruction set of codes, and with a memory accessible to the processing system;
   a user-interface controller, controlled by the processing system;
   user-interface logic, comprising first machine codes stored in the memory and selected from the predefined native instruction set of codes of the hardware processor, adapted to operate with the user-interface controller to implement a user interface on a flow control display; and
flow-control logic, comprising second machine codes stored in the memory and selected from the predefined native instruction set of codes of the hardware processor, adapted to interact with the set of flow components and the motive power source;
the flow-control logic having a first flow-control sublogic controlling the nozzle unit valve to close, the drain valve to close, the filter vent valve to close, the pump to propel the fluid, and the motive power source not to apply the first rotational force nor the third rotational force; and
the flow-control logic having a second flow-control sublogic controlling the nozzle unit valve to open, the drain valve to open, the pump to cease to propel the fluid, and the motive power source to apply the first rotational force and the third rotational force.

3. The apparatus of claim 2, wherein:
the flow control system further comprises an access point (AP) for data communications;
the AP is under control of the processing system;
the AP is adapted to connect to a network; and
the processing system is configured to communicate messages across the network via the AP.

4. The apparatus of claim 3, wherein the messages include email messages.

5. The apparatus of claim 3, wherein the messages conform to a file transfer protocol.

6. The apparatus of claim 3, wherein the processing system is further configured to send alarm messages that indicate status information.

7. The apparatus of claim 3, wherein the processing system is further configured to generate log files of events including one or more of filter pressure data and cleaning cycle records.

8. The apparatus of claim 7, wherein the processing system is further configured to automatically communicate the log files without requiring a request to initiate communication.

9. The apparatus of claim 3, wherein the processing system implements an inter-device connection service (IDCS) that permits remote access for maintenance and support.

10. The apparatus of claim 9, wherein the processing system is configured to receive updates, of software or firmware used in the flow control system, via the IDCS.

11. The apparatus of claim 1, further comprising a pump, external to the housing, operable to supply pressure to push fluid into the first structure as the fluid under pressure.

* * * * *